US007219350B2

(12) United States Patent
Bhogal et al.

(10) Patent No.: US 7,219,350 B2
(45) Date of Patent: *May 15, 2007

(54) DYNAMIC SERVER PAGE META-ENGINES WITH DATA SHARING FOR DYNAMIC CONTENT AND NON-JSP SEGMENTS RENDERED THROUGH OTHER ENGINES

(75) Inventors: Kulvir Singh Bhogal, Fort Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

This patent is subject to a terminal disclaimer.

(21) Appl. No.: 10/392,784

(22) Filed: Mar. 19, 2003

(65) Prior Publication Data

US 2004/0187136 A1   Sep. 23, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................. 719/310; 715/760
(58) Field of Classification Search ........ 719/310–320, 719/328–330; 715/512–517, 760–762
See application file for complete search history.

(56) References Cited

U.S. PATENT DOCUMENTS 5,794,046 A    8/1998   Meier et al. ................. 395/704

6,067,565 A    5/2000   Horvitz ....................... 709/218

(Continued)

FOREIGN PATENT DOCUMENTS

CA        2317072      4/2001

(Continued)

OTHER PUBLICATIONS

Fields et al, Web Development with Java Server Pages, Manning Publications, 2000, pp. 340-344.*

(Continued)

*Primary Examiner*—William Thomson
*Assistant Examiner*—Diem Cao
(74) *Attorney, Agent, or Firm*—Justin Dillon; H. Artoush Ohanian; Biggers & Ohanian, LLP

(57) ABSTRACT

Rendering a meta-page through a meta-engine, the meta-engine including a tag handler, the meta-page including static content, JSP dynamic content and one or more types of non-JSP dynamic content, and identifications of shared variables. Embodiments include writing to output the static content of the meta-page, rendering the JSP dynamic content to the output of the meta-engine, and inserting into the non-JSP dynamic content additional non-JSP dynamic content identifying current values of shared variables. Embodiments include rendering the non-JSP dynamic content through dynamic server page engines, including passing current values of shared variables to the dynamic server page engines, reading from the non-JSP additional dynamic content as rendered the current values of shared variables, deleting from the non-JSP dynamic content as rendered the additional non-JSP dynamic content as rendered, and writing the non-JSP dynamic content as rendered, at its location among the static content, to the output of the meta-engine.

12 Claims, 9 Drawing Sheets

U.S. PATENT DOCUMENTS

| | | | | |
|---|---|---|---|---|
| 6,078,924 | A | 6/2000 | Ainsbury et al. | 707/101 |
| 6,085,226 | A | 7/2000 | Horvitz | 709/203 |
| 6,286,061 | B1 | 9/2001 | Ross | 710/33 |
| 6,826,594 | B1* | 11/2004 | Pettersen | 709/203 |
| 2004/0015608 | A1* | 1/2004 | Ellis et al. | 709/246 |
| 2004/0073565 | A1* | 4/2004 | Kaufman et al. | 707/101 |

FOREIGN PATENT DOCUMENTS

| | | |
|---|---|---|
| WO | WO 01/33422 A2 | 10/2001 |

OTHER PUBLICATIONS

Yuen, A.; "A Timy Pearl Server Pages Engine"; Dr. Dobb's Journal, vol. 26, No. 8, pp. 71, 73, 77-78, 80, 82, 84; Aug. 2001.

Pontelli, E., et al.; "Construction and Optimization of a Parallel Engine for Answer Set Programming"; Lecture Notes in Computer Science, University of Maryland; Nov. 2001.

Hariharan, R., et al.; "End to End Performance Modeling of Web Server Architectures"; Performance Evaluation Review; vol. 28, No. 2, pp. 57-63; Sep. 2000.

Angell, K.W.; "Python Server Pages: Part 1"; Dr. Dobb's Journal; vol. 25, No. 1, pp. 44-52; Jan. 2000.

* cited by examiner

DYNAMIC SERVER PAGE META-ENGINES WITH DATA SHARING FOR DYNAMIC CONTENT AND NON-JSP SEGMENTS RENDERED THROUGH OTHER ENGINES

BACKGROUND OF THE INVENTION

1. Field of the Invention

The field of the invention is data processing, or, more specifically, methods, systems, and products for operation of dynamic server page engines.

2. Description of Related Art

Dynamic server pages comprise dynamic content. Dynamic content is, for example, in the case of the World Wide Web, web page content that includes the usual static content such as display text and markup tags, and, in addition, executable program content. Executable program content includes, for example, Java, VBScript, CGI gateway scripting, PHP script, and Perl code. The kind of executable program content found in any particular dynamic server page depends on the kind of dynamic server page engine that is intended to render the executable program content. For example, Java is typically used in Java Server Pages ("JSPs") for Java Server Page engines (sometime referred to in this disclosure as "JSP engines"); VBScript is used in Active Server Pages ("ASPs") for Microsoft Active Server Page engines (sometime referred to in this disclosure as "ASP engines"); and PHP script, a language based on C, C++, Perl, and Java, is used in PHP pages for PHP: Hypertext Preprocessor engines.

JSPs compile into servlets, and servlets are expressed in Java. 'Servlets' are Java programs that run on a server, as opposed to a browser, where Java programs running in browsers are referred to as 'applets.' Detailed information about servlets can be found on Sun Microsystems' website. In fact, many JSP engines are themselves implemented as Java servlets. Detailed information about JSPs can be found on Sun Microsystems' website. 'Java,' 'Java Server Pages,' and 'JSP' are trademarks of Sun Microsystems, Inc.

There are several kinds of dynamic server page engines, each of which typically is capable of rendering only one kind of dynamic server page, in each case, of course, it is the particular kind of dynamic server page for which the engine was developed in the first place. JSP engines render JSPs. ASP engines render ASPs. PHP engines render PHP pages. And so on. In some cases, however, the fact that engines only render a single kind of dynamic server page is a problem.

Consider, for example, the case of Java Server Page engines. With the arrival of Java and its related benefits, many companies that formerly ran, as dynamic server pages, Microsoft Active Server Pages ("ASPs") using VBScript are making a useful but difficult transition to Java Server Pages ("JSPs") using the Java language. This transition is often accomplished by programmers experienced in VBScript or Visual Basic but less experienced in Java. In current art, a transition to a Java platform requires use of separate server page engines which cannot run ASPs and JSPs simultaneously. A web server in current technology has difficulty distinguishing ASPs and JSPs by inspecting file content because the markup tags in both types of dynamic server page are very similar, one reason no doubt why web servers generally are not programmed to distinguish dynamic server pages on the basis of content inspections.

In fact, in many cases the markup tags for the two types of dynamic content, JSP and ASP, are identical, although their program content is quite different. ASP engines will not execute or render correctly JSPs. It is cumbersome to make a large migration to JSPs and Java servlets from a totally ASP-based architecture. Alternatively, companies may use separate test servers or separate ports and careful alternate routing to try to assure that that no JSP program content exists on the same pages with ASP programming. For all these reasons, it would be advantageous to have a way to mix JSP and ASP dynamic content in the same dynamic server page, a new kind of dynamic server page, a 'meta-page,' as it were. To do so, it would be useful to have a new kind of dynamic server page engine, an engine that could accept and somehow render, to a static output, inputs of any kind of dynamic content. Such an engine could be referred to as a 'meta-engine.'

SUMMARY OF THE INVENTION

Exemplary embodiments of the invention include methods for rendering a dynamic server meta-page ("a meta-page") through a dynamic server page meta-engine ("a meta-engine") including a tag handler, the meta-page including static content, JSP dynamic content and one or more types of non-JSP dynamic content inserted at two or more locations among the static content, and identifications of shared variables. Such embodiments include writing, to an output of the meta-engine, the static content of the meta-page, and rendering the JSP dynamic content, at its location among the static content, to the output of the meta-engine. Typical embodiments include inserting into the non-JSP dynamic content additional non-JSP dynamic content identifying current values of shared variables, and rendering the non-JSP dynamic content, including the additional non-JSP dynamic content, through dynamic server page engines, including passing current values of shared variables to the dynamic server page engines.

Exemplary embodiments of the invention include reading from the non-JSP additional dynamic content as rendered the current values of shared variables, deleting from the non-JSP dynamic content as rendered the additional non-JSP dynamic content as rendered, and writing the non-JSP dynamic content as rendered, at its location among the static content, to the output of the meta-engine. In such embodiments, rendering the non-JSP dynamic content through dynamic server page engines includes writing, from a tag handler to a dynamic server page, non-JSP dynamic content, including the additional non-JSP dynamic content, and invoking a dynamic server page engine to render the non-JSP dynamic content.

Exemplary embodiments of the invention include methods for making a meta-engine.

Exemplary embodiments include providing a tag library descriptor mapping tag handlers in a tag handler library to meta-tags each of which identifies a type of dynamic markup, and providing the tag handler library including a tag handler for each type of non-JSP dynamic content supported by the meta-engine, in which each tag handler includes an identification of a dynamic server page engine for rendering one type of non-JSP dynamic content. In such embodiments, each tag handler is programmed to carry out the steps of identifying shared variables and current values of shared variables for the tag handler, inserting into non-JSP dynamic content additional non-JSP dynamic content identifying current values of shared variables, and rendering non-JSP dynamic content, including the additional non-JSP dynamic content, through dynamic server page engines, including passing current values of shared variables to the dynamic server page engines. In typical embodiments, each tag handler is programmed to carry out the steps of reading from the non-JSP additional dynamic content as rendered the current values of shared variables, deleting from the non-JSP dynamic content as rendered the additional non-JSP dynamic content as rendered, and writing the non-JSP dynamic content as rendered, at its location among the static content, to the output of the meta-engine.

Exemplary embodiments of the invention include methods for creating a meta-page. Exemplary embodiments include establishing a JSP dynamic server page as the meta-page, and inserting static content into the meta-page. Such embodiments include inserting JSP dynamic content and one or more types of non-JSP dynamic content at two or more locations among the static content, and inserting into the meta-page identifications of shared variables.

In exemplary embodiments of the invention, inserting identifications of shared variables includes inserting into the meta-page Java code identifying shared variables. In such embodiments, inserting Java code identifying shared variables includes inserting Java code associating shared variables with segments of non-JSP dynamic content. In typical embodiments, inserting Java code identifying shared variables includes inserting Java code associating shared variables with input and output to and from segments of non-JSP dynamic content.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAIL DESCRIPTION OF EXEMPLARY EMBODIMENTS

Introduction

Figure 1:
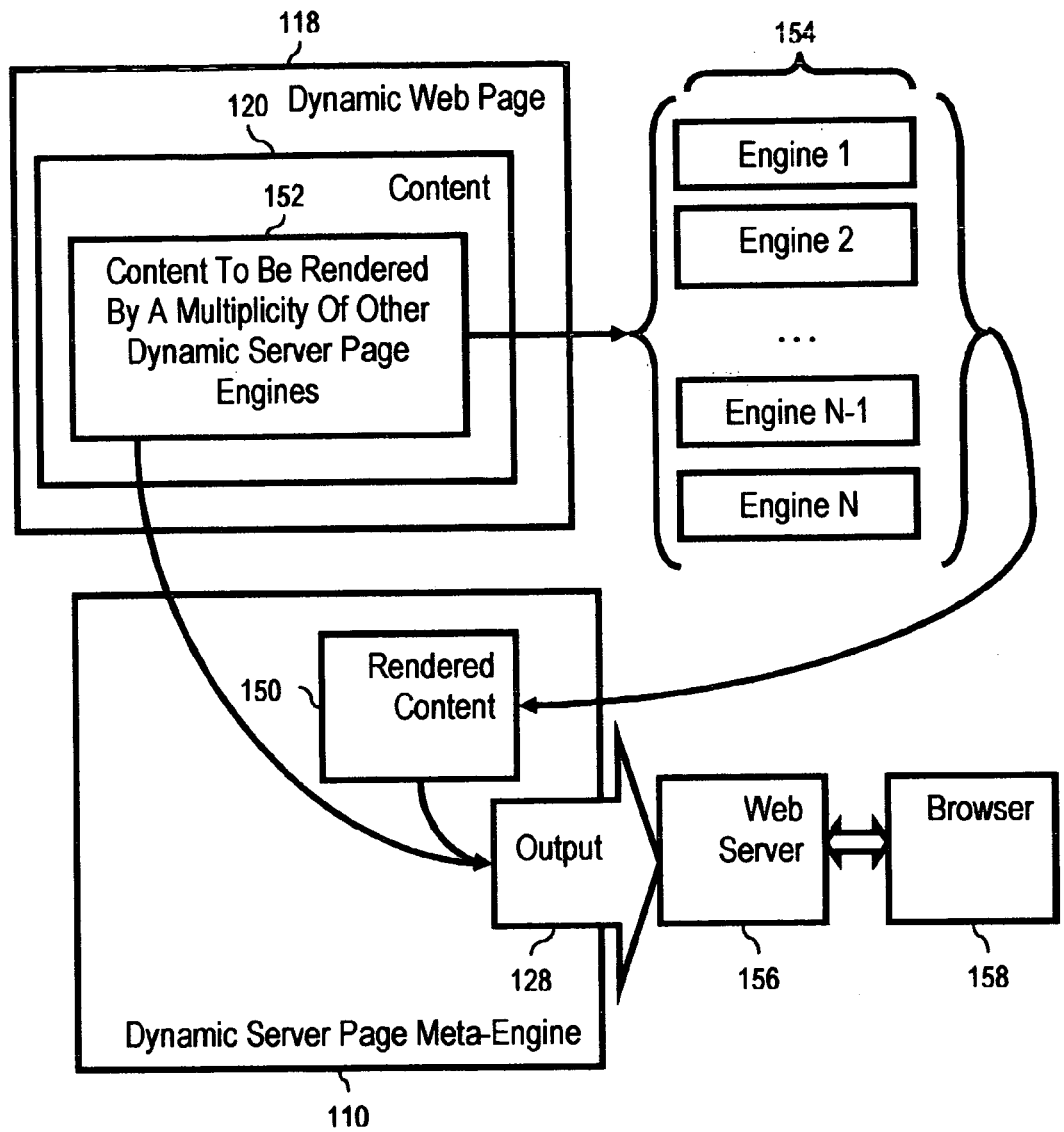
FIG. 1 is a general block diagram of an exemplary embodiment of the present invention.

The present invention is described to a large extent in this specification in terms of methods for operation of dynamic server page engines. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including, for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product are implemented by use of any recording medium for machine-readable information, including magnetic media, optical media, or other suitable media. Persons skilled in the art will immediately recognize that any computer system having suitable programming means is capable of executing the steps of the method of the invention as embodied in a program product.

Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects." Aggregates of records are referred to as "tables" or "files." Aggregates of files are referred to as "databases."

"Browser" means a web browser, a software application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML and HDML.

A "data communications client" is any data communications software capable of performing network-based data communications, including email clients, browsers, and special purpose software systems. In typical embodiments of the present invention, data communications clients run on "data communications devices," which are any automated computing machinery capable of supporting data communications including web-enabled devices and handheld devices including telephones, web-enabled personal digital assistants, laptop computers, handheld radios, and communicators.

A "hyperlink," also referred to as "link" or "web link" is a reference to a resource name or network address which when invoked allows the named resource or network address to be accessed. Often the hyperlink identifies a network address at which is stored a web page. As used here, "hyperlink" is a broader term than "HTML anchor element." Hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data and server-side script output as well.

"CGI" means "Common Gateway Interface," a standard technology for data communications of resources between web servers and web clients. More specifically, CGI provides a standard interface between servers and server-side 'gateway' programs which administer actual reads and writes of data to and from files systems and databases. The CGI interface typically sends data to gateway programs through environment variables or as data to be read by the gateway programs through their standard inputs. Gateway programs typically return data through standard output. It is typically a gateway program that provides a MIME type in a return message header advising a server, and eventually therefore a browser or other communications client, of the type of data returned from CGI gateway programs.

"HDML" refers to the Handheld Device Markup Language, similar to WML, a markup language for Web-enabled mobile phones. HDML is proprietary to Openwave Systems, Inc. HDML uses Openwave's Handheld Device Transport Protocol ("HDTP"), instead of WAP. To serve HDML pages, administrators add the text/x-hdml mime type to their Web servers.

"HTML" stands for 'HyperText Markup Language,' a standard markup language for displaying web pages on browsers.

"HTTP" stands for 'HyperText Transport Protocol,' the standard data communications protocol of the World Wide Web.

A "markup element" as the term is used in this disclosure refers to the content of a dynamic server page included within a tag, that is, included between a start tag and an end tag, including the start tag and the end tag. The content between the start tag and the end tag is referred to as the 'body' of the element. For tags marking dynamic content, the body of the element identified by a start tag and an end tag is itself the dynamic content. More particularly, for example, the following is an example of a markup element in which <JSP-Content> is a start tag, </JSP-Content> is an end tag, the markup element is the entire example, including the start tag and end tag, and the body is the dynamic content between the start tag and the end tag:

```
<JSP-Content>
    Here is dynamic web content to
    Be rendered by a Java Server Page engine,
    Including text, markup, and Java code
</JSP-Content>
```

'Meta-data' is data about data. Similarly, in the exemplary embodiments discussed in this disclosure, a 'meta-page' is a page about a page, that is, a dynamic server page from which other dynamic server pages are derived for rendering by other engines, derived by extracting from the meta-page and inserting into other, temporary pages, segments of dynamic content. In a similar sense, a 'meta-engine,' as the term is used in this disclosure in describing exemplary embodiments of the present invention, is an engine about other engines, a dynamic server page engine that carries out its work of rendering a meta-page at least partly by invoking one or more other engines to render other pages derived from a meta-page.

"Network" is used in this specification to mean any networked coupling for data communications among computers or computer systems. Examples of networks useful with the invention include intranets, extranets, internets, local area networks, wide area networks, and other network arrangements as will occur to those of skill in the art.

"PHP" is a recursive acronym for "PHP: Hypertext Preprocessor," an open-source server-side scripting language freely downloadable from php.net or zend.com. PHP is a scripting language for dynamic web pages, called PHP pages, rendered on PHP engines. PHP's scripting syntax is based on C, Perl, C++, and Java. PHP directly incorporates support for connectivity to most common databases, including Oracle, Sybase, MySQL, ODBC and others. PHP also supports integration with various external libraries, which allows developers to do anything from generating PDF documents to parsing XML. PHP is particularly associated with dynamic page development on Linux machines using Apache web servers, but runs also on any other UNIX or Windows platform, with Netscape or Microsoft Web server software. PHP also supports HTTP sessions, Java connectivity, regular expressions, LDAP, SNMP, IMAP, COM (under Windows) protocols.

We mention PHP in conjunction with Apache servers because Apache servers are so common on the web. Apache web servers are open source servers developed by the Apache HTTP Server Project, a project of the Apache Software Foundation.

"Pseudocode" is exemplary source code in a programming language or examples of markup in a markup language that is used for explanation in this disclosure. Pseudocode is not represented as conforming strictly to the requirements of any particular programming language or markup language, so that there is no representation that pseudocode examples from this disclosure will compile or execute. Pseudocode examples will, however, help with explanation so as to enable persons of skill in the art to make and use application integration adapters according to embodiments of the present invention. The code and markup examples in this disclosure generally are pseudocode examples, useful for explaining the construction and operation of various exemplary embodiments of the present invention.

"Resource" means any aggregation of information administered over networks by various embodiments of the present invention. Network communications protocols generally, for example, HTTP, transmit resources, not just files. A resource is an aggregation of information capable of being identified by a URI or URL. In fact, the 'R' in 'URI' is 'Resource.' The most common kind of resource is a file, but resources include dynamically-generated query results, the output of CGI scripts, dynamic server pages, documents available in several languages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources are currently either files or server-side script output. Server side script output includes output from CGI programs, Java servlets, Active Server Pages, Java Server Pages, and so on.

"Server" in this specification refers to a computer or device comprising automated computing machinery on a network that manages network resources. A "web server" in particular is a server that communicates with browsers by means of HTTP in order to manage and make available to networked computers markup language documents and digital objects. Web servers tasked with rendering dynamic server pages through dynamic server page engines are often referred to in the industry as 'web application servers.' In this disclosure, 'web server' includes 'web application servers.'

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually the Internet. URLs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, for example to store or retrieve data, a URI often includes query parameters, or data to be stored, in the form of data encoded into the URI Such parameters or data to be stored are often referred to as 'URI encoded data.' Such parameters or data, because they often originate in HTML forms, are also sometimes known as 'form data.'

"URI encoded data" is data packaged in a URI for data communications. In the case of HTTP communications, the HTTP GET and POST functions are often used to transmit URI encoded data. In this context, it is useful to remember that URIs do more than merely request file transfers. URIs identify resources on servers. Such resource may be files having filenames, but the resources identified by URIs also may include, for example, queries to databases. Results of such queries do not necessarily reside in files, but they are nevertheless data resources identified by URIs and identified by a search engine and query data that produce such resources. An example of URI encoded data is:

http://www.foo.com/cgi-bin/
MyScript.cgi?field1=value1&field2=value2

This is an example of URI encoded data, which is how variable names and values typically are submitted over the web using HTTP GET request messages. This method using the GET message is useful when the amount of data to be encoded is fairly small. For larger amounts of data, it is more common to use HTTP POST messages for HTML form submissions.

More specifically, the entire example above is a URI bearing encoded data, and the encoded data is the string "field1=value1&field2=value2." The encoding method is to string field names and field values separated by '&' and "=" with spaces represented by '+.' There are no quote marks or spaces in the string. Having no quote marks, spaces are encoded with '+,' and '&' is encoded with an escape character, in this example, '%26.' For example, if an HTML form has a field called "name" set to "Lucy", and a field called "neighbors" set to "Fred & Ethel", the data string encoding the form would be:

name=Lucy&neighbors=Fred+%26+Ethel

"URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." In this specification, we refer to such identifiers generally as URIs.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement a hyperlinking protocol, such as HTTP or WAP, in support of URIs and documents in markup languages, regardless whether such servers or groups of servers are coupled to the World Wide Web as such.

"WAP" stands for 'Wireless Application Protocol,' a proposed web-related data communications specification, or 'initiative,' directed toward wireless web enabled devices such as mobile phones, pagers, two-way radios, smartphones and communicators. WAP supports most wireless networks, including for example, CDPD, CDMA, GSM, PDC, PHS, TDMA, FLEX, ReFLEX, iDEN, TETRA, DECT, DataTAC, and Mobitex. WAP is supported by most operating systems, including those designed specifically engineered for wireless web enabled devices such as PalmOS, EPOC, Windows CE, FLEXOS, OS/9, and JavaOS. WAP implementations that use displays and access the Internet run microbrowsers, browsers with small file sizes that can accommodate low memory constraints of handheld devices and low-bandwidth constraints often associated with wireless networks. Although WAP supports HTML and XML, the WML language (an XML application) is specifically devised for small screens and one-hand navigation without a keyboard.

"WML" stands for 'Wireless Markup Language,' an XML language used as a markup language for web content intended for wireless web-enabled devices that implement WAP. There is a WAP forum that provides a DTD for WML. A DTD is an XML 'Document Type Definition.'

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modem browsers and other communications clients tend to support markup languages other than HTML, including, for example, XML.

DETAILED DESCRIPTION

FIG. 1 is a block diagram illustrating in a general way an embodiment of the present invention. The system of FIG. 1 shows a dynamic server page meta-engine capable of rendering into static web content, the dynamic content of a dynamic server page when the dynamic server page contains dynamic web content to be rendered by other engines. In this disclosure, for clarity, especially when speaking of several dynamic server pages and sometimes several different kinds of dynamic server pages, the kind of dynamic server page containing content to be rendered by engines other than a meta-engine is generally the 'first' dynamic server page under discussion, and such dynamic server pages are sometimes referred to as 'meta-dynamic server pages' or simply as 'meta-pages.'

In this disclosure, "dynamic server page engine" generally means any aggregation of computer software capable of accepting dynamic content as input and providing static content as output. This is perhaps a slightly broader definition than usual in the industry, because in terms of the present invention, gateway programs for operation in conjunction with Common Gateway Interfaces are perfectly useful with various embodiments of the invention, although perhaps not exactly what is traditionally understood as a dynamic server page engine. In this sense, a dynamic server page meta-engine in accordance with the present invention is a dynamic server page engine.

Dynamic content of dynamic server pages and ordinary static web content are distinguished. Ordinary HTML files typify static web content. Speaking generally and simply, ordinary HTML files can be viewed as containing only two things: text for display on data communications clients and markup for the text. Dynamic server pages, on the other hand, contain not only text and markup but also executable program content. Executable program content includes, for example, Java and VBScript. The kind of executable program content found in any particular dynamic server page depends on the kind of dynamic server page engine intended to render the executable program content. For example, Java in JSPs for JSP engines; VBScript in ASPs for ASP engines; and PHP script in PHP pages for PHP engines. Dynamic server page meta-engines implemented according to the present invention, however, typically can handle any kind of dynamic or executable program content.

More specifically, FIG. 1 shows a system that includes a dynamic server page meta-engine (110), a dynamic web page (118), and, in addition to the dynamic server page meta-engine, a number of other dynamic server page engines (154). The dynamic web page (118) includes, among its content (120), content (152) to be rendered by dynamic server page engines (154) other than the dynamic server page meta-engine. The dynamic server page engines (154) other than the meta-engine include, include many kinds of engines for rendering dynamic content as will occur to those of skill in the art, including, for example, ASP engines, JSP engines, PHP engines, and so on.

In operation, such an embodiment channels web content (120) from the first dynamic web page to an output (128) and channels the content to be rendered by dynamic server page engines other than the dynamic server page meta-engine (152) to other dynamic web page engines to be rendered by them. That is, the first dynamic web page in this example is a web page containing both static and dynamic content, where at least some of the dynamic content is to be extracted into another dynamic web page and sent to another dynamic server page engine for rendering. Web pages like this 'first dynamic web page' are often referred to in this disclosure as 'meta-pages,' because in typical exemplary embodiments of the present invention, at least part of their content is formed into other dynamic server pages. The content (150) so rendered by other engines is returned to the dynamic server page meta-engine (110) and written into the output (128) in-line, and in correct sequence generally, with the web content (120) from the dynamic server page (118).

Embodiments of dynamic server page meta-engines according to FIG. 1 are typically invoked by URIs, including data-encoding URIs, issued from data communications clients, such as browsers (158), to data communications servers such as web servers (156). In addition to executable program content in dynamic web pages, it is also the use of data-encoding URIs that makes some web pages 'dynamic,' in that independent variables and their values encoded into data-encoding URIs vary the function of executable program content that depends upon the values of the variables.

Consider the example of a CGI script that queries a database and returns query results as static web content. The CGI script is invoked by a data-encoding URI comprising selection criteria for records in a database and the query results are one or more records that satisfy the selection criteria. The substance of the query results returned varies according to the values of the variables comprising selection criteria. The action of all executable program content varies similarly, that is, 'dynamically,' in dependence upon variable values encoded in data-encoding URIs used to invoke the executable program content.

It should now be clear that the engine referred to in this disclosure as "the dynamic server page meta-engine" is effectively a kind of super engine, the kind of thing we can correctly call a 'meta-engine' or a 'para-engine.' By this we mean that the first dynamic server engine as implemented in typical embodiments of the present invention is a dynamic server page engine that carries out its functions, at least partly, by invoking other dynamic server page engines. For this reason, generally in this disclosure, that first dynamic server page engine is referred to as a 'dynamic server page meta-engine,' or often simply as a 'meta-engine.'

Figure 2:
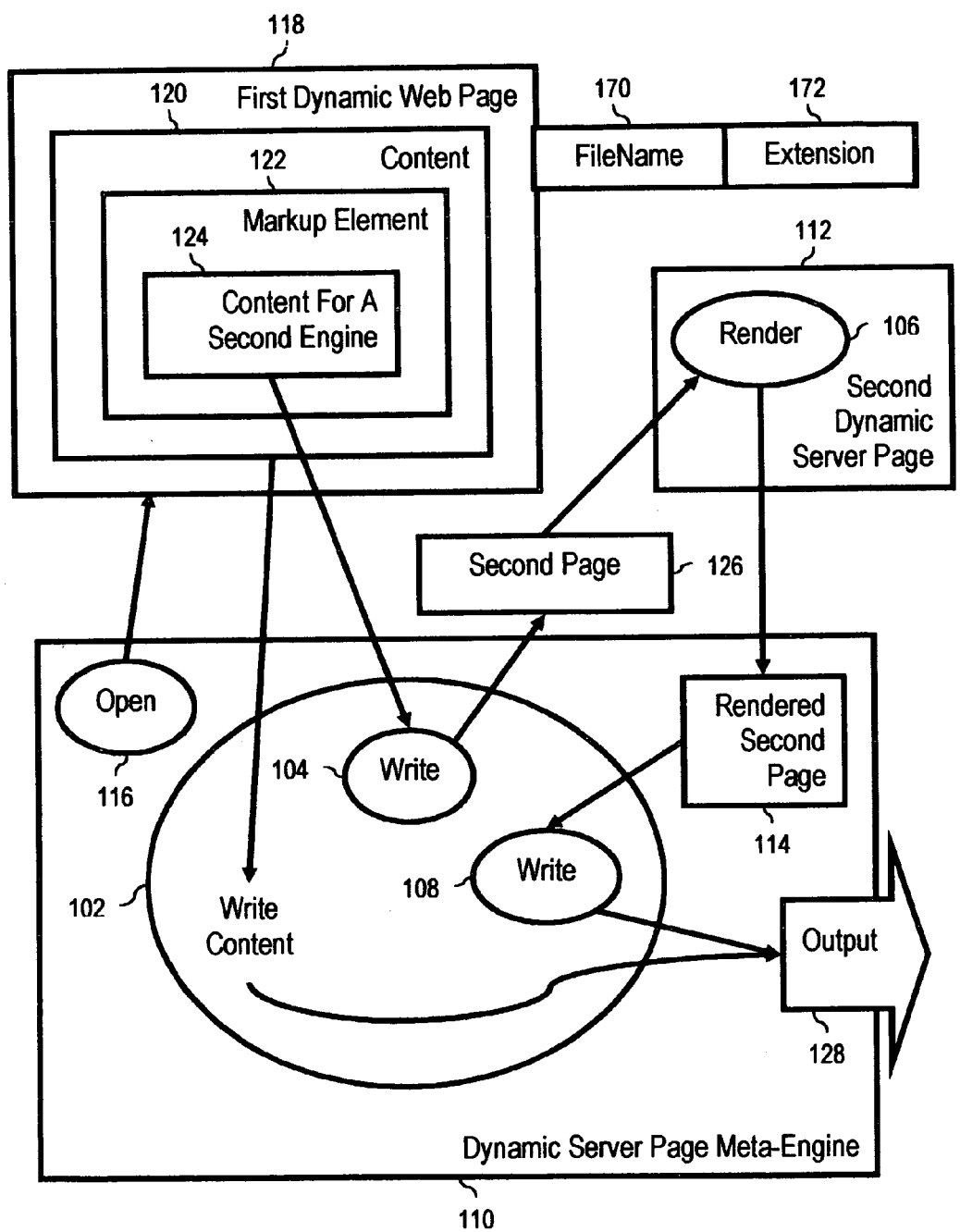
FIG. 2 is a data flow diagram of an exemplary embodiment of the present invention.

Turning to FIG. 2, a further embodiment of the invention is shown as a method for operation of dynamic server page engines. Embodiments according to FIG. 2 include opening (116) in a first dynamic server page engine (110) a first dynamic server page (118). In embodiments of the kind illustrated, the first dynamic server page engine is a dynamic server page meta-engine (110) according to the present invention. Dynamic server pages to be rendered by meta-engines, such as the one illustrated at reference (118), are often referred to in this disclosure as "dynamic server meta-pages" or simply as "meta-pages."

In typical embodiments of this kind, the first dynamic server page comprises content (120), the content further comprising at least one markup element (122), the markup element comprising content to be rendered by a second dynamic server page engine (124). In embodiments of this kind, the first dynamic server page also typically comprises a file name (170) having a file name extension (172) identifying the first dynamic server page (118) as a dynamic server page to be rendered by the dynamic server page meta-engine (110).

Embodiments of the kind illustrated by FIG. 2 also typically include writing (102), to an output (128) of the dynamic server page meta-engine, the content (120) of the first dynamic server page. In such embodiments, writing the content of the first dynamic server page typically includes writing (104), to a second dynamic server page (126), the content (124) to be rendered by a second dynamic server page engine (112). Such embodiments typically include rendering (106), in the second server page engine (112), the second server page (126), providing back to the dynamic server page meta-engine, as output from the rendering, the second dynamic server page as rendered (114). Such embodiments typically also include writing (108), in-line with the content of the first dynamic server page (120), the second dynamic server page as rendered (114) to the output of the dynamic server page meta-engine (128).

In typical embodiments, the markup element (122) further comprises a tag and, optionally, one or more attributes. The tag often comprises a start tag and an end tag. More particularly, a start tag typically has the form <TagName>, and an end tag has the form </TagName>. Using such tags, dynamic web content in a dynamic server page, that is, a meta-page, has, for example, this format:

```
<JSP-Content>
   Here is dynamic web content to
   Be rendered by a Java Server Page engine,
   Including text, markup, and Java code
</JSP-Content>
```

In this example, the entire content including the start tag <JSP-Content> and the end tag </JSP-Content> comprise a markup element in a dynamic server page. The markup element includes a tag and dynamic content identified by the tag as dynamic content to be rendered by a particular kind of dynamic server page engine, in this example, a Java Server Page engine.

Here is a larger example of meta-page content:

```
<JSP-Content>
   Here is dynamic web content to
   Be rendered by a Java Server Page engine,
   Including text, markup, and Java code
</JSP-Content>
Here is static web content to
Be rendered, written directly to output,
By a dynamic server page meta-engine,
Including text and markup, HTML, WML, XML, and so on
<ASP-Content>
   Here is dynamic web content to
   Be rendered by an Active Server Page engine,
   Including text, markup, and VBScript
</ASP-Content>
```

As described in more detail below, a dynamic server page meta-engine of the present invention, in rendering this example content, places the content between <JSP-Content> and </JSP-Content> in a file with a .jsp file name extension, calls a Java Server Page engine to render that content, and writes the content so rendered to the output of the meta-engine. Then the meta-engine writes the static content to its output. Then the meta-engine places the content between <ASP-Content> and </ASP-Content> in a file with an .asp file name extension, calls an Active Server Page engine to render that content, and writes the content so rendered to the output of the meta-engine. In this way, a meta-engine of the present invention renders dynamic server pages having any kind of dynamic content, all mixed together by programmers, changing content type arbitrarily at any time or place simply by inserting appropriate tags in a dynamic web page.

In some embodiments, the second dynamic server page engine (112) is a Microsoft Active Server Page engine. In other embodiments, the second dynamic server page engine (112) is a Java Server Page engine. In fact, it is clear after this explanation that the second dynamic server page is, in various embodiments, any dynamic server page engine whatsoever.

Figure 3:
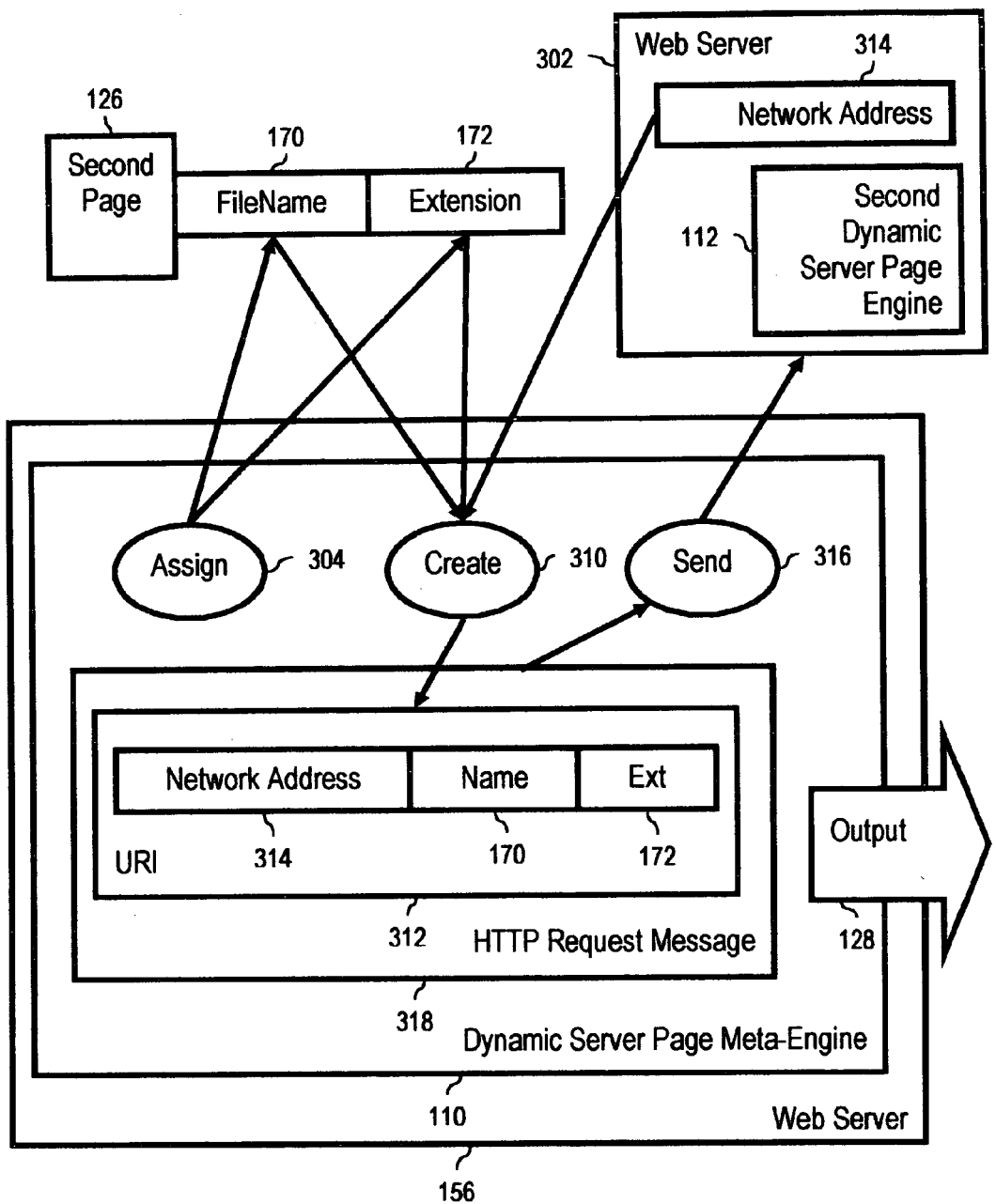
FIG. 3 is a data flow diagram of a further exemplary embodiment of the present invention.

Turning now to FIG. 3, a further embodiment of the invention is illustrated as including assigning (304) to the second dynamic server page (126) a file name (170) having a file name extension (172) identifying the second dynamic server page as a dynamic server page to be rendered by the second dynamic server page engine (112).

That is, for example, if the second dynamic server page contains JSP program content, then the file name extension is typically "jsp," to identify the second dynamic server page as a Java Server Page to be rendered by a Java Server Page engine. If the second dynamic server page contains ASP program content, then the file name extension is typically "asp," to identify the second dynamic server page as an Active Server Page to be rendered by an Active Server Page engine. And so on. The file name in front of the extension can be anything, as long as it is known to the dynamic server page meta-engine so that is can be assigned to the second dynamic server page.

Embodiments of the kind shown in FIG. 3 typically include creating (310) a URI (312) comprising a network address (314) for a web server (302) where the second dynamic server page engine (112) is located and the file name (170), including the file name extension (172), of the second dynamic server page. Such embodiments typically include sending (316) the URI (312) to the web server (302) in an HTTP request message (318).

The network address (314) is typically either an IP address as such or a domain name that resolves to an IP address. That is, the network address has the form 123.53.54.001, for example, or it has the form "SomeWebServer.com," where SomeWebServer.com is a domain name that is resolved by a Domain Name Service ("DNS") into an IP address having the first form. Either form of network address is useful in URIs of the present invention.

If, for example, a web server (302) has the domain name "AWebServer.com," and the file name and extension of the second dynamic server page add up to "A-JSP-Page.jsp," then a URI comprising these elements is created in this exemplary form:

http://www.AWebServer.com/A-JSP-Page.jsp

That is a basic example. It is very common, however, that the second dynamic server page needs variable values to implement its dynamism, and in such cases, the URI has a form more like this:

http://www.AWebServer.com/A-JSP-Page.jsp?field1=value1&field2=value2 where value1 and value2 are variable values for the variables named field1 and field2 respectively. Such variable values are, for example, taken by the meta-engine from a data-encoding URI that called the meta-engine to render the first dynamic server page, in effect, passing the variables and their values through to other dynamic server page engines as needed. Persons of skill in the art will think of other ways to pass variables from a meta-engine to other dynamic server page engines, and all such ways are well within the scope of the present invention.

Further regarding creation of URIs, let us return to our earlier larger example of dynamic web content in a meta-page:

```
<JSP-Content>
   Here is dynamic web content to
   Be rendered by a Java Server Page engine,
   Including text, markup, and Java code
</JSP-Content>
Here is static web content to
Be rendered, written directly to output,
By a dynamic server page meta-engine,
Including text and markup, HTML, WML, XML, and so on
```

```
<ASP-Content>
  Here is dynamic web content to
  Be rendered by an Active Server Page engine,
  Including text, markup, and VBScript
</ASP-Content>
```

As mentioned above, a dynamic server page meta-engine of the present invention, in rendering this example content, places the dynamic content in a files with appropriate name extensions, calls dynamic server page engines to render that dynamic content, and writes the content so rendered to the output of the meta-engine. Now we see in more detail how this typically is done.

Typically, a meta-engine includes in computer memory a data structure associating tags with file name extensions and web server addresses of servers where particular dynamic server page engines are located. Here is an example of such a data structure:

| Tag | Extension | Address |
| --- | --- | --- |
| JSP-Content | jsp | AWebServer.com |
| ASP-Content | asp | AnotherWebServer.com |
| PHP-Content | php | StillAnotherServer.com |
| CGI-Content | cgi | AFurtherServer.com |

A meta-engine of the present invention, having in its computer memory the associations exemplified in the structure just above, upon encountering in a dynamic web page a tag <JSP-Content>, places the dynamic content so tagged in a second dynamic web page having any file name but having the files name extension 'jsp,' creates a URI in this form:

http://www.AWebServer.com/anyfilename.jsp, sends the URI to the web server AWebServer.com in an HTTP request message, and writes returned rendered content to its output. Similarly, such a meta-engine, upon encountering in a dynamic web page a tag <ASP-Content>, places the dynamic content so tagged in another dynamic web page having any file name but having the files name extension 'asp,' creates a URI in this form:

http://www.AnotherWebServer.com/anyfilename.asp, sends the URI to the web server AnotherWebServer.com in an HTTP request message, and writes returned rendered content to its output.

Similarly, such a meta-engine, upon encountering in a dynamic web page a tag <PHP-Content>, places the dynamic content so tagged in another dynamic web page having any file name but having the file name extension 'php,' creates a URI in this form:

http://www.StillAnotherServer.com/anyfilename.php, sends the URI to the web server StillAnotherServer.com in an HTTP request message, and writes returned rendered content to its output. Similarly, such a meta-engine, upon encountering in a dynamic web page a tag <CGI-Content>, places the dynamic content so tagged in another dynamic web page having any file name but having the files name extension 'cgi,' creates a URI in this form:

http://www.AFurtherServer.com/anyfilename.cgi, sends the URI to the web server AFurtherServer.com in an HTTP request message, and writes returned rendered content to its output.

Meta-Page Content Includes Dynamic Content for Rendering by More than One Dynamic Server Page Engine Other than a Meta-Engine As mentioned above, the web content (120) in dynamic web pages of the present invention (118) typically include at least one markup element comprising content to rendered by a dynamic server page engine other than the dynamic server page meta-engine. Although it is not a required element of the invention, as a practical matter, many, if not most, embodiments of dynamic web pages according to the present invention contain more than one markup element comprising content to be rendered by dynamic server engines other than the dynamic server page meta-engine. We illustrate this point more closely by reference to FIG. 4.

Figure 4:
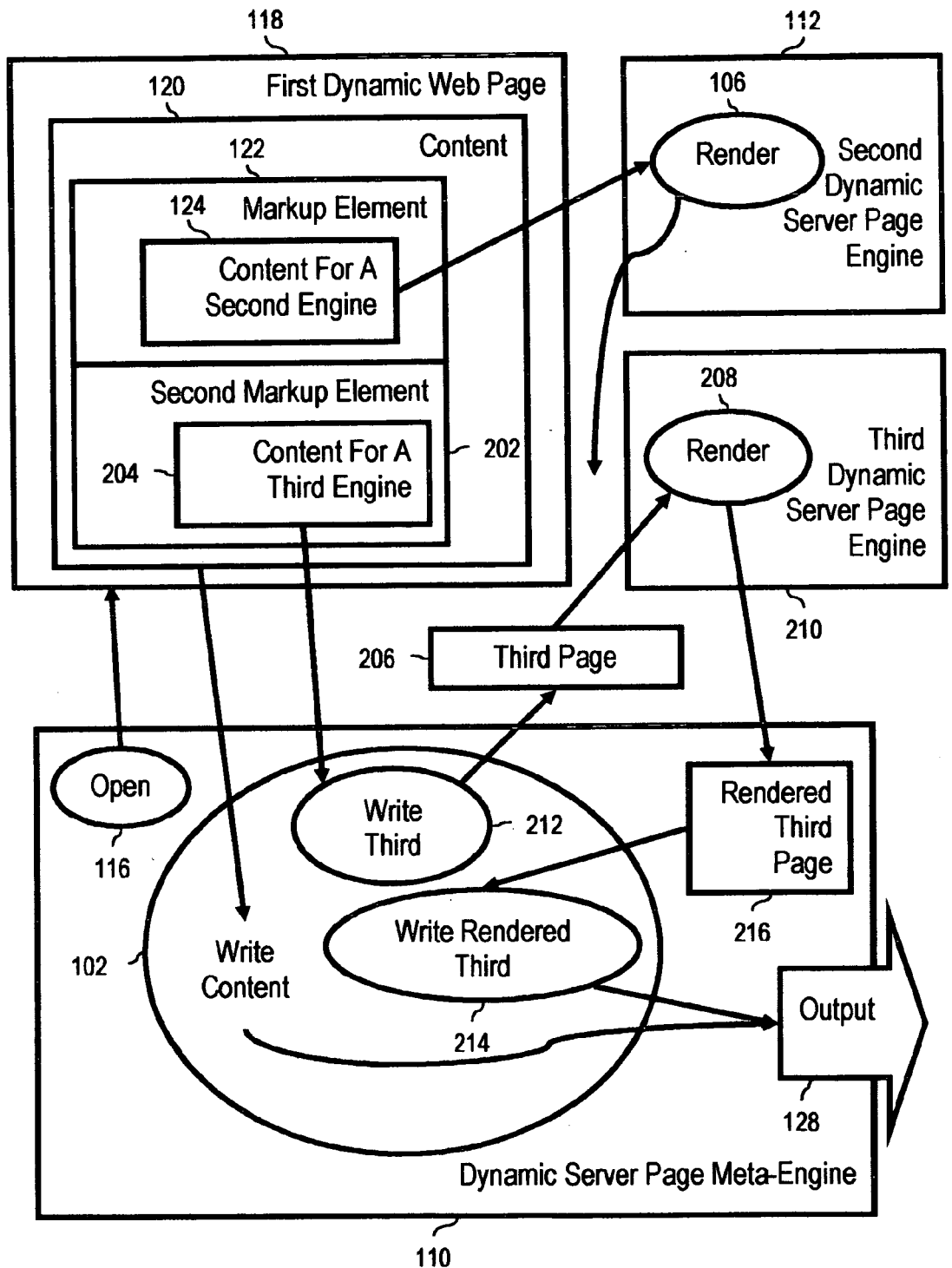
FIG. 4 is a data flow diagram of a still further exemplary embodiment of the present invention.

Turning now to FIG. 4, a further embodiment of the invention is illustrated in which the content (120) of a first dynamic server page (118) includes, in addition to a first markup element (122), a second markup element (202). The second markup element in the illustrated embodiment comprises content (204) to be rendered by a third dynamic server page engine (210).

Embodiments according to FIG. 4 include writing (212), to a third dynamic server page (206), the content (204) to be rendered by a third dynamic server page engine. Such embodiments include rendering (208), in the third server page engine (210), the third server page (206), providing back to the dynamic server page meta-engine, as output from the rendering, the third dynamic server page as rendered (216). Such embodiments include writing (214), in-line with the content of the first dynamic server page (120), the third dynamic server page as rendered (216) to the output of the dynamic server page meta-engine (128).

In some embodiments according to FIG. 4, the second dynamic server page engine (112) is a Java Server Page engine and the third dynamic server page engine (210) is a Microsoft Active Server Page engine. Although this particular example discusses only two dynamic server page engines in addition to the meta-engine, it is clear by now in our discussion that such embodiments include content to be rendered by any number of dynamic server page engines other than the dynamic server page meta-engine. It is clear also that dynamic server page engines useful with various embodiments of the present invention include any aggregation of computer software and hardware capable of accepting dynamic web content as an input and rendering to an output, in dependence upon the dynamic web content, static web content. Such engines include Java Server Page engines, Microsoft Active Server Page engines, Perl Server Page Engines, CGI gateway programs, and others as will occur to those of skill in the art.

Meta-Pages with Filename Extensions Identified with Other Engines

As mentioned above, embodiments of the kind shown in FIG. 3 typically include creating (310) a URI (312) comprising a network address (314) for a web server (302) where the second dynamic server page engine (112) is located and the file name (170), including the file name extension (172), of the second dynamic server page. Such embodiments typically include sending (316) the URI (312) to the web server (302) in an HTTP request message (318). In such embodiments, it is common for the process (shown at references 124, 104, and 126 on FIG. 2) of writing content for a second engine to a second dynamic server page to include writing such content to the second dynamic server page on the web server (302) where the second dynamic server page is located, or on the same computer as the web server where the second dynamic server page is located. FIG. 3 shows the meta-engine (110) as comprised within the web server (156) to illustrate the usefulness of separating the engines onto separate servers, in many embodiments, although such separation is not a necessary requirement of the invention.

More particularly, FIG. 3 shows the meta-engine (110) as comprised within the web server (156) to illustrate the fact that there is no requirement within the present invention for the use of any particular file name extension for URIs that invoke the meta-engine. That is, dynamic web pages containing content for a second engine have any file name extension known to a web server upon which the meta-engine is installed as intended to be rendered by the meta-engine. Such filename extensions often are '.msp,' implying 'meta-server pages,' but any filename extension can be used to invoke a meta-engine as long as a web server of the meta-engine associates the filename extension with the meta-engine.

Even more particularly, in many embodiments, filename extensions invoking meta-engines are implemented as '.jsp' or '.asp,' the traditional filename extensions for Java Server Pages and Active Server Pages. This is a surprising and useful characteristic of many embodiments of the present invention. Consider the following example:

A company wishes to migrate many Active Server Pages to Java Server Pages. Many programmers are hired to aid the transition. The Active Server Pages contain many lines of VBScript. Even more important, URIs invoking the Active Server Pages are located in thousands of web pages and bookmark listings all over the world. If the programmers change the filename extensions to '.msp' in preparation for converting the Active Server Pages to meta-pages to be rendered by a meta-engine, then all those thousands of references to the Active Server Pages will be instantly rendered useless. There are workarounds for that, but they are awkward. In embodiments of the present invention, however, the solution is elegant.

The programmers simply open the Active Server Pages, insert tags identifying content to be administered by Active Server Page engines, insert tags identifying new Java code to be entered by the programmers, and then identify to a server, upon which is installed a meta-engine, that URIs calling dynamic server pages with filename extensions of '.asp' are to be rendered by the meta-engine, not by an Active Server Page engine. In this example solution, none of the filenames or filename extensions of the Active Server Pages are altered at all, thus leaving all the thousands of URIs all over the world referring to them completely valid and continuously useful, despite the fact that those Active Server Pages are no longer simply Active Server Pages, containing now as they do Java code, making those former Active Server Pages into dynamic server pages that can no longer be rendered by either an Active Server Page engine or a Java Server Page engine. Now those former Active Server Pages are pages of the present invention, dynamic server pages that require a meta-engine for rendering.

Readers now will have noticed that there are two kinds of dynamic server pages under administration in this example, both of which have filename extensions of '.asp.' The former Active Server Pages, now in effect 'meta-pages,' still have '.asp' filename extensions, and the second dynamic server pages (126) to which is written the content to be rendered by an Active Server Page engine also have, in many embodiments, filename extensions of '.asp.'

The apparent risk of confusion is handled by the fact that the second dynamic server page engine (112) responsible for rendering the second dynamic server pages having filename extensions of '.asp,' as mentioned above, resides on a web server (302) other than the web server (156) on which the meta-engine (110) is installed. Thus the network address (314) resolved for URIs invoking the second dynamic server page (126) is different from the network address resolved by URIs comprising filename extensions invoking the meta-engine. This is one way of administering the apparent risk of confusion. Other ways will occur to those of skill in the art, and all such ways are well within the scope of the present invention.

In addition to the benefit of leaving many, many referring URIs intact and useful by not changing the filename extension of former Active Server Pages, there is an additional benefit that should be clear at this point. That additional benefit is the extreme simplicity of transitioning to Java through embodiments of the present invention. In this example, all the programmer had to do was simply open existing dynamic server pages in a text editor, mark the existing content with tags, mark off a new content area with tags indicating content for a Java Server Page engine, and start typing in Java code. In particular, there is no need in this example for the programmer or the company experiencing the transition to Java Server Pages to convert an entire system, or even an entire page, of Active Server Pages to Java before beginning active use of Java. Instead, the programmer and the company are enabled to move in the direction of a new technology one sensible step at a time. This is a very fine benefit of the present invention.

Meta-Engines Built from Other Engines

Now we direct the reader's attention again to our earlier larger example of dynamic web content in a meta-page:

```
<JSP-Content>
    Here is dynamic web content to
    Be rendered by a Java Server Page engine,
    Including text, markup, and Java code
</JSP-Content>
Here is static web content to
Be rendered, written directly to output,
By a dynamic server page meta-engine,
Including text and markup, HTML, WML, XML, and so on
<ASP-Content>
    Here is dynamic web content to
    Be rendered by an Active Server Page engine,
    Including text, markup, and VBScript
</ASP-Content>
```

Remember that in this example, the content to be rendered directly by the meta-engine is static markup content such as HTML, WML, XML and the like. It is useful in some kinds of embodiments of the present invention, however, to have the capability of rendering dynamic content directly through a meta-engine. A meta-engine capable of directly rendering dynamic content is in some embodiments, for example, a modified dynamic server page engine, such as, for example, a modified JSP engine. Because a JSP engine already has the capability of directly rendering dynamic Java content as well as static markup and text, a meta-engine of the present invention implemented by adding the capabilities of embodiments of the present invention to a JSP engine, for example, has the capability also of rendering, by invoking other engines, dynamic content to be rendered by other engines as well as directly rendering static content and dynamic JSP content.

In describing building a meta-engine by modifying another dynamic server page engine, we discuss a JSP engine merely as one example of another dynamic server page engine to be modified. Readers understand that any dynamic server page engine can be so modified, and all such modifications of dynamic server page engines to implement meta-engines are well within the scope of the present invention.

For such a meta-engine, our larger example of dynamic content useful in such embodiments is modified as follows:

```
<ContentForASecondEngine>
   Here is dynamic web content to
   Be rendered by an engine other than the meta-engine,
   such as, for example, an ASP engine, a Perl engine,
   CGI Gateway scripts, and so on.
</ContentForASecondEngine>
Here is static content and dynamic web content to
Be rendered by a Java Server Page engine, including
text, markup, and Java code, in this example, including all
static content and all Java dynamic content in the meta-page
between the two example entries, just above and just below,
of tags for content to be rendered by other engines
<ContentForAThirdEngine>
   Here is dynamic web content to
   Be rendered by an engine other than the meta-engine,
   such as, for example, an ASP engine, a Perl engine,
   CGI Gateway scripts, and so on.
</ContentForAThirdEngine>
```

More particularly, for the case of ASP, JSP, and static content only, for such a meta-engine, our larger example of dynamic content useful in such embodiments is modified as follows:

```
<ASP-Content>
   Here is static and dynamic web content to
   Be rendered by an Active Server Page engine,
   Including text, markup, and VBScript
</ASP-Content>
Here is static content and dynamic web content to
Be rendered by a directly by the meta-engine, including
text, markup, and Java code, in this example, including all
static content and all Java dynamic content in the meta-page
between the two example entries, just above and just below,
of tags for content to be rendered by another engine
<ASP-Content>
   Here is more static and dynamic web content to
   Be rendered by an Active Server Page engine,
   Including text, markup, and VBScript
</ASP-Content>
```

In such embodiments, just as in the embodiments described earlier, the meta-engine still writes to the output of the dynamic server page meta-engine, in-line with the content of the first dynamic server page, here called a meta-page, the second dynamic server page as rendered, in this case, rendered by an ASP engine. In this class of embodiment, however, the 'content of the first dynamic server page' includes not only static content but also dynamic Java content rendered by the meta-engine as well.

Implementation of such a meta-engine includes editing the source code of a JSP engine to include the functionality of at least one embodiment of the present invention, content tags for other engines, writing to secondary files content tagged for other engines, invoking the other engines, and so on. The benefits of such embodiments include ease of use in transitions to Java Server Pages.

More particularly, consider our earlier example of programmers hired to convert ASPs to JSPs. In that example, the programmers using the kind of embodiment described were required to tag all dynamic content including the Java dynamic content for rendering by engines other than the meta-engine. Programmers using this class of embodiments, embodiments in which the meta-engine is built on a JSP engine foundation, however, are not required to tag pre-existing static content or new Java-oriented dynamic content.

That is, programmers using this class of embodiments, in converting ASPs, for example, to meta-pages, need only open the ASPs in their editors, tag off the dynamic content to be rendered by ASP engines, and then start programming, entering both additional static content as well as new Java-oriented dynamic content which would in other embodiments need to be rendered by a separate JSP engine but in this class of embodiments is rendered directly by the meta-engine. Filename extensions of '.asp' are left as they are, and the filename extension '.asp' is identified to a web server for the meta-engine as referring to the meta-engine, as described in more detail above, thus preserving the usefulness of many URIs probably already pointing to the ASPs under conversion. Although we discuss this particular example in terms of ASPs and JSPs, in fact, any such transition among categories of dynamic content is well within the scope of the present invention. And any such transition is greatly eased by use of various embodiments of the present invention in programming environments for dynamic server pages.

Sharing Variable Values Among Segments of Dynamic Content

In addition to the ability to render more than one type of dynamic content through a single meta-page, it would also be advantageous to be able to share variable values among segments of dynamic content, even when the segments are dynamic content of more than one type, to be rendered through more than one dynamic server page engine. That is, it would be advantageous if, for example, the value of a variable declared or dimensioned in a meta-page in one segment of dynamic content written in VBScript for rendering in an ASP could be retrieved and used later in the same meta-page by a segment of dynamic content written in Java to be rendered in a JSP—and then used again later in the same meta-page by a segment of dynamic content written in Perl to be rendered through a CGI script—and so on.

Figure 5:
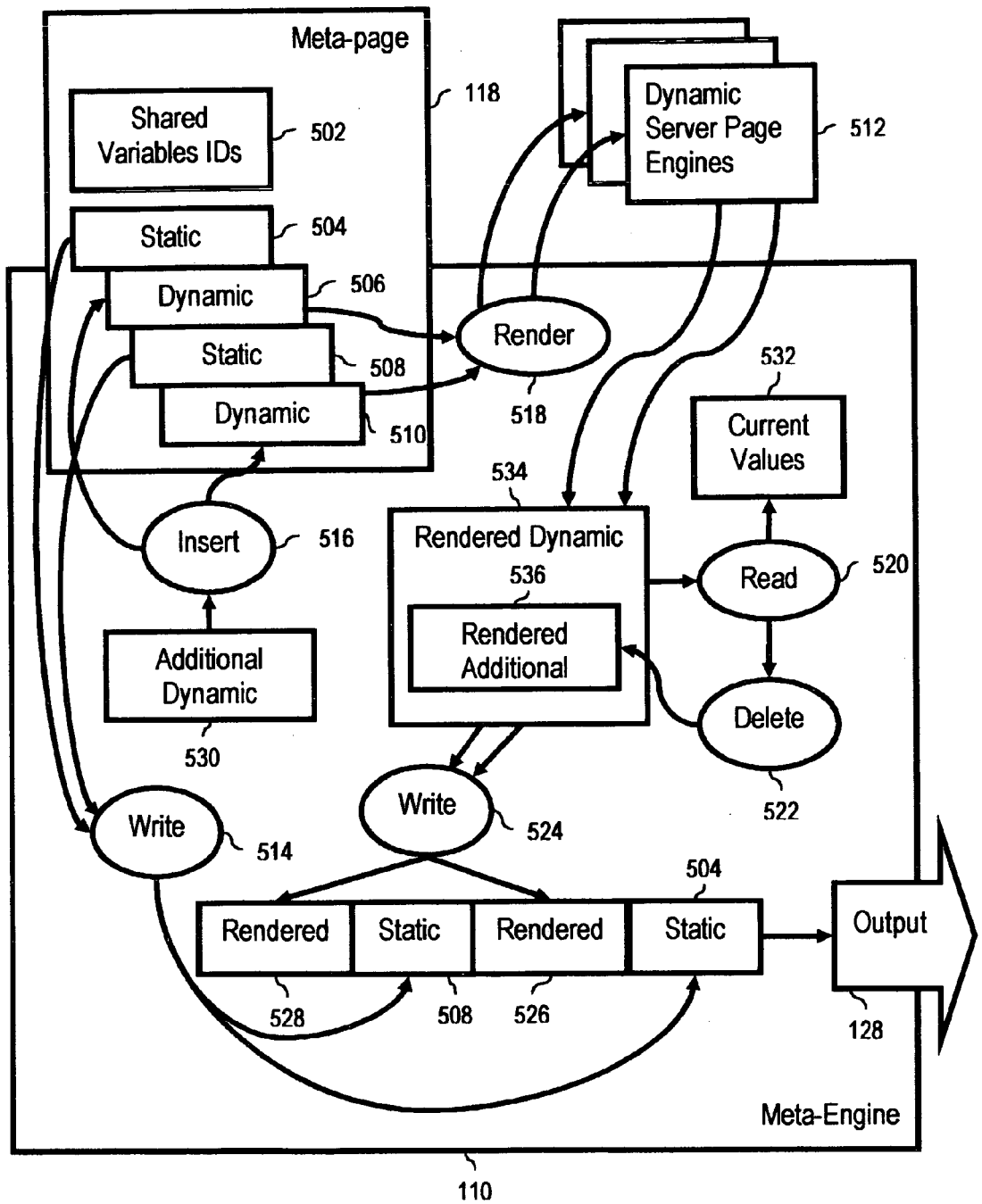
FIG. 5 sets forth a data flow diagram illustrating a method of sharing variable values among segments of dynamic content.

FIG. 5 sets forth a data flow diagram illustrating a method of sharing variable values among segments of dynamic content, even when the dynamic content is written in different languages and is rendered by different dynamic page engines. More particularly, FIG. 5 sets forth a data flow diagram illustrating an exemplary method for rendering a dynamic server meta-page ("a meta-page") (118) through a dynamic server page meta-engine ("a meta-engine") (110), the meta-page comprising static content (504, 508), dynamic content (506, 510) inserted at two or more locations among the static content, and identifications (502) of shared variables.

The method of FIG. 5 includes writing (514), to an output (128) of the meta-engine, the static content (504, 508) of the dynamic server meta-page (118). The meta-engine opens a meta-page, identified to it through a URI as described in detail above in this disclosure. The meta-page contains text that also includes markup. Some of the markup identifies segments of the text as dynamic content. Text not identified as dynamic content is treated by the meta-engine as static content and is directed without further processing to an output of the meta-engine. In many, if not most, embodiments, the meta-engine directs static content to its 'standard output.'

As an aid to explanation, here following is an example of a meta-page presented in an exemplary new markup format called "HMML" for Hypertext Meta-page Markup Language.

```
<HMML>
  <BODY>
    Static web content: rendered and written directly to output by a
    dynamic server page meta-engine, without transmission to any other
    engine, including text and markup, HTML, WML, XML, and so on
    <DynamicContent segType="JSP">
      Dynamic web content to be rendered by a JSP engine,
      text, markup, and Java code, including, for example:
      int mouseCount = 10;
      out.println(mouseCount + "blind mice.");
    </DynamicContent>
    More static content
    More static content
    <DynamicContent segType="ASP">
      Dynamic web content to be rendered by a ASP engine,
      text, markup, and Visual Basic, including, for example:
      dim mouseNum = 20;
      response.write &mouseNum "blind mice"
    </DynamicContent>
    More static content
    More static content
    <DynamicContent segType="CGI">
      Dynamic web content to be rendered by a CGI engine,
      text, markup, and Perl script, including, for example:
      &miceNum = 30;
      printf("%d blind mice.", $miceNum);
    </DynamicContent>
    More static content
    More static content
  </BODY>
</HMML>
```

In this example, a URI is capable of invoking the meta-page for rendering through a meta engine because a server upon which the meta-engine is installed supports a new mime type: text/x-hmml, identified to the server when the meta-engine is installed upon the server. Mime types are standardized by the IANA, the Internet Assigned Numbers Authority. The 'standard' for non-standard mime types is to prefix them with an 'x.' It would be a little presumptuous to assume that this exemplary new mime type were so quickly a standard, hence the 'x' in x-hmml. HMML can be implemented as an XML-style superset of HTML so that, to the extent that HTML needs rendering within the meta-engine, such output can be included in the plain text directed to the output of the meta-engine without rendering by other dynamic server page engines. In such an example, the meta-engine can be viewed as a kind of, or an adjunct to an, XML-enabled HTTP service.

The meta-page set forth above is a useful example for explanation of the overall structure of typical meta-pages. For more particular explanation, consider the following, more schematic example meta-page:

```
<HMML>
  <BODY>
    Static content
    <DynamicContent segType="JSP"> /* Java */
      int mouseCount = 10;
      out.println(i + "blind mice.");
    </DynamicContent>
    Static content
    <DynamicContent segType="ASP"> /* Visual Basic */
      dim mouseNum = 20;
      response.write &i "blind mice"
    </DynamicContent>
  </BODY>
</HMML>
```

This example concisely illustrates the point that the meta-page includes segments of dynamic content among static content, the segments of dynamic content contain variables whose values may advantageously be coordinated, but the values of those variables are uncoordinated in this example. That is, in this example, both segments of dynamic content contain variable pertinent to mouse counting, but there no way for the Java segment to share its mouse count with the Visual Basic segment. This specification discloses solving this problem by identifying shared variables within the meta-page, passing names and values of shared variables in URIs from the meta-engine to each dynamic server page engine that renders a segment of dynamic content from the meta-page, and, to the extent that each segment of dynamic content processes or affects the value of a shared variable, retrieving the new value of the variable from the output of each such segment so that its current value can be passed to other segments downstream in the meta-page as needed.

As mentioned above, the configuration of a meta-page generally includes static content and dynamic content. Here is presented a more particular description of creating meta-pages including identifications of shared variables (502 on FIG. 5). This explanation of configuring meta-pages proceeds with reference to FIG. 6, which sets forth a data flow diagram illustrating an exemplary method for creating a meta-page.

Figure 6:
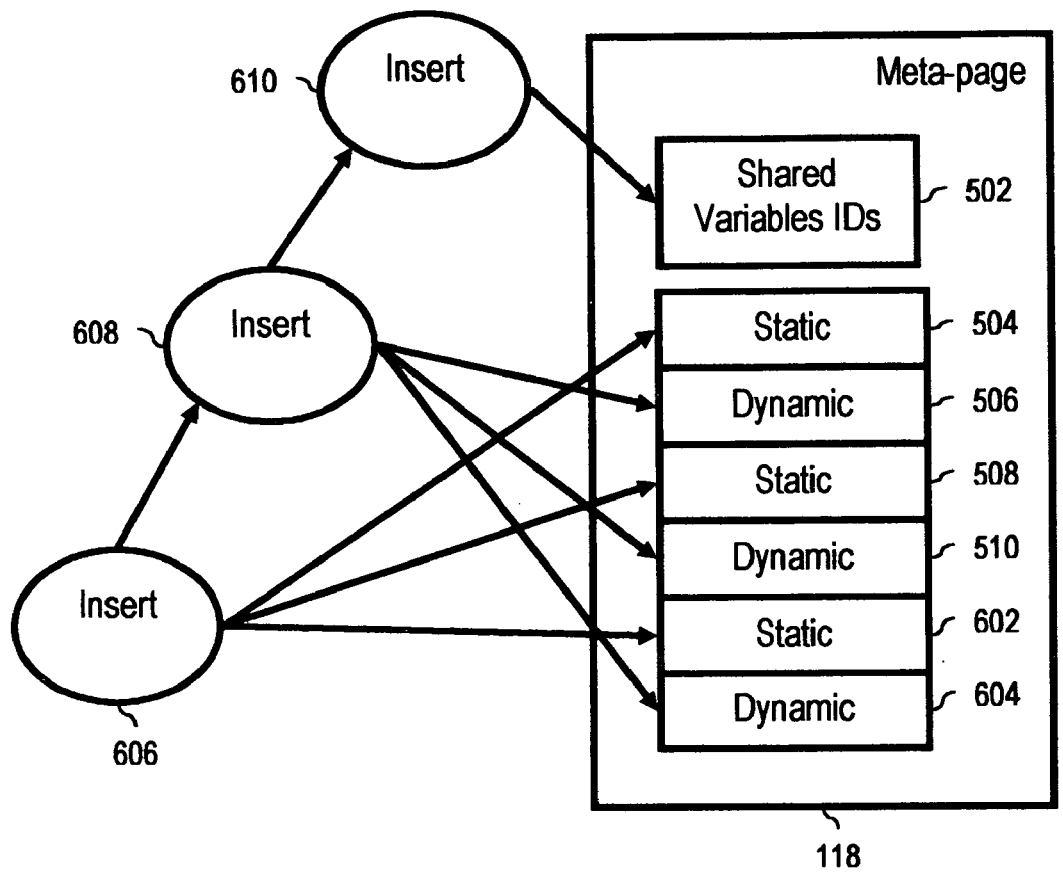
FIG. 6 sets forth a data flow diagram illustrating an exemplary method for creating a meta-page.

More particularly, the method of FIG. 6 includes inserting (606) static content (504, 508, 602) into the meta-page (118) and inserting (608) dynamic content (506, 510, 604) at two or more locations among the static content, as explained above. The method of FIG. 6 also includes inserting (610) into the meta-page identifications (502) of shared variables. In typical embodiments of the method of FIG. 6, inserting dynamic content further comprises inserting into the meta-page two or more segments of dynamic content, each segment of dynamic content having a location and a type. Both the location and the type of a segment of dynamic content in the examples in this disclosure are implemented with markup. In the meta-pages set forth just above in this disclosure, for example, the <JSP-Content> tag indicates the location of a Java segment among the static content and the tag name itself, "JSP-Content," identifies the type of the segment as a Java segment or a segment to be rendered by a JSP engine. Similarly, the <ASP-Content> tag identifies the location and the type of a Visual Basic segment of dynamic content to be rendered by an ASP engine.

In typical embodiments of the method of FIG. 6, inserting (610) identifications (502) of shared variables further comprises inserting into the meta-page markup identifying shared variables. The following markup, for example:

```
<SharVar id="Mouse Counter">
    <Alias segID="JSP">mouseCount</Alias>
    <Alias segID="ASP">miceCount</Alias>
    <Alias segID="CGI">miceNum</Alias>
</SharVar>
``` identifies a variable for mouse counting, the variable to be shared among three segments of dynamic content, one JSP segment, one ASP segment, and one CGI segment. The name of the variable in the JSP segment is "mouseCount." In the ASP segment, the same variable, or rather, a variable intended to share the same value, is named "miceCount," and in the CGI segment it is named "miceNum." From the point of view of the dynamic content segments themselves, the values of the markup elements, mouseCount, mice-Count, and miceNum, are the actual variable names in use in the segments. From the point of view of the meta-page and the meta-engine, each values of a markup element identifying a shared variable can be considered an alias for the same underlying shared value.

In some embodiments, the initial value of a shared variable is provided by the first segment of dynamic content to manipulate the variable. If the first segment of dynamic content is in C, C++, or Java and the shared variable is an integer, then the first segment will contain code similar to:

int mouseCount=10;

After the first segment of dynamic content in a meta-page initializes and evaluates a shared variable, the meta-engine retrieves the current value of the shared variable from the output of the segment and retains the current value of the shared variable in computer memory until it is later needed by a further segment of dynamic content.

In other embodiments, an initial value of a shared value is passed to the request object of a meta-page in data encoded in the URI that calls the meta-page. The meta-engine then retrieves the initial value of the variable from the request object, stores it in computer memory as the current value of the shared variable, and passes it to the first segment of dynamic content as data encoded into the URI created by the meta-engine to call the dynamic server page created to contain and render the first segment of dynamic content.

Not all segments of dynamic content share all shared variables. In many embodiments of the method of FIG. 6, therefore, inserting (610) markup (502) identifying shared variables includes inserting markup associating shared variables with segments of dynamic content. The following markup, for example:

```
<HMML>
  <BODY>
    <SharVar id="Mouse Counter">
        <Alias segID="JSP">mouseCount</Alias>
        <Alias segID="ASP">miceCount</Alias>
    </SharVar >
    Static content
    <DynamicContent segID="JSP">  /* Java */
        int mouseCount = 10;
        out.println(i + "blind mice.");
    </DynamicContent>
    Static content
    <DynamicContent segID= "CGI"> /* Perl */
        &miceNum = 30;
        printf ("%d blind mice.", $miceNum);
    </DynamicContent>
```

-continued

```
    Static content
    <DynamicContent segID="ASP"> /* Visual Basic */
        /* Visual Basic reads current value of
        /* of miceCount from its input request object
        /* and runs various calculations upon it
        /* then prints it to standard output:
        response.write &miceCount "blind mice"
    </DynamicContent>
  </BODY>
</HMML>
``` shows a meta-page containing three segments of dynamic content where the markup in the meta-page identifies a variable for mouse counting and associates it with only two of the three segments of dynamic content. That is, the Java segment initializes the shared variable whose then current value is retrieved by the meta-engine and passed, not to the CGI segment which is not listed as sharing the variable and is therefore skipped in the sharing process, but to the ASP segment (through a calling URI) which obtains the value of the variable from its input request object, manipulates it in various ways and provides its value back on its standard output. In this example, the association of the shared variables with the segments of dynamic content is carried out by use of the segment type identifier taken in the variable identifications as a segment identifier, a procedure that is useful where, as in this example, there is only one segment per segment type. When more than one segment of a type of dynamic content is present in the meta-page, such as, for example, two segment of Java for a JSP engine, then an additional segment identifier is useful, further explained below.

Not all segments of dynamic content share variables in the same way, for example, where each segment takes a variable as an input, manipulates, and renders its then current value to output. Some segments need a variable as input when the segment would not naturally output the value of the variable and when no further segments downstream in the meta-page need the value of that variable; the meta-engine would have no need to retrieve the current value of such a variable from the last segment of dynamic content that needed it. The need for sharing a variable may skip one or more segments of dynamic content within a meta-page. The need for a variable as an input may not begin with the first segment of dynamic content. A variable may be manipulated so as to change its value by one or more segments and its then current value may be needed by more than one downstream segment so that there is no need to retrieve its value from other downstream segments. For all these reasons, in many embodiments of the method of FIG. 6, inserting (610) markup (502) identifying shared variables includes inserting markup associating shared variables with input and output to and from segments of dynamic content. The following markup, for example:

```
<HMML>
  <BODY>
    <SharVar id="Mouse Credit">
        <Alias inSeg="1" outSeg="1">mouseCount</Alias>
        <Alias inSeg="3" outSeg="">miceNum</Alias>
        <returnTagName>MouseCredit</returnTagName>
    </SharVar >
    <SharVar id="Mouse Debit">
        <Alias inSeg="" outSeg="2">mouseDown</Alias>
```

-continued

```
        <Alias inSeg="3" outSeg="">miceMinus</Alias>
        <returnTagName>MouseDebit</returnTagName>
    </SharVar >
    Static content
    <DynamicContent segType = "JSP" segID="1"> /* Java */
        int mouseCount = request.getParameter("mouseCount");
        mouseCount += 10;
        out.println(mouseCount + "blind mice.");
    </DynamicContent>
    Static content
    <DynamicContent segType="ASP" segID="2"> /* Visual
        Basic */ dim mouseDown
        mouseDown = 20
        response.write &mouseDown "blind mice"
    </DynamicContent>
    Static content
    <DynamicContent segType="JSP" segID="3"> /* More Java */
        int myMiceNum = request.getParameter("miceNum");
        int myMiceMinus = request.getParameter("miceMinus");
        myMiceNum += 30;
        myMiceMinus += 40
        miceNet = miceNum – miceMinus
        out.println(miceNet + "blind mice.");
    </DynamicContent>
</BODY>
</HMML>
``` shows a meta-page containing three segments of dynamic content where the markup in the meta-page identifies two shared variables for mouse counting one for counting mouse increments ("Mouse Credit") and one for counting mouse decrements ("Mouse Debit"). This meta-page includes three segments of dynamic content, two Java segments for a JSP engine and one Visual Basic segment for an ASP engine. Because there are two Java segments, it is no longer useful to refer to them by their type code because the type code "JSP" is now ambiguous, identifying equally two segments of dynamic content. Advantageously therefore this example provides a segment identification code "segID" for unambiguous identification of the three segments of dynamic content.

This exemplary meta-page includes markup:

<Alias inSeg="1" outSeg="1">mouseCount</Alias> associating the Mouse Credit variable with the first of the three segments of dynamic content, for the Java alias "mouseCount," as both an input to the segment (in Seg="1") and an output from the segment (outSeg="1"). The first dynamic segment administers mouse accounting with an interest only in the upside, mouse increments or credits. The first dynamic segment reads the value of mouseCount from its input request object:

int mouseCount=request.getParameter("mouseCount").

That is, the first dynamic segment does not provide an initial value of the mouse count, depending instead on its input request object to provide a value for mouseCount, a value that in turn is provide from its calling meta-engine which in turn took the value from its request object which in turn was encoded into a calling URI that called the meta-engine in the first instance. After performing calculations that affect the value of mouseCount, the first segment of dynamic content writes the current value of mouseCount to its standard output:

out.println(mouseCount+"blind mice.").

The meta-engine reads the value of mouseCount from its standard input which is receiving the stream from the standard output of the JSP engine that is called to render the first dynamic segment. Thus the shared value of the Mouse Credit variable is both an input to and an output from the first segment of dynamic content.

This exemplary meta-page includes markup:

<Alias inSeg=" " outSeg="2">/mouseDown</Alias> associating the Mouse Debit variable with the second of the three segments of dynamic content, for the Visual Basic alias "mouseDown," as only an output from the segment (outSeg="2"). The second dynamic segment administers mouse accounting with an interest only in the downside, mouse decrements or debits. The second dynamic segment, rather than reading a value for mouseDown from an input request object, instead provides its own value, initializing mouseDown with:

dim mouseDown mouseDown=20

After performing calculations that affect the value of mouseDown, the first segment of dynamic content writes the current value of mouseDown to its standard output:

response.write &mouseDown "blind mice"

The meta-engine reads the value of mouseDown from its standard input which is receiving the stream from the standard output of the ASP engine that is called to render the second dynamic segment. Thus in this example, the shared value of the Mouse Debit variable is an output from, but not an input to, the second segment of dynamic content. And the second dynamic segment is an example of a dynamic segment that creates a new variable having a new alias "mouseDown" that initializes the value of a shared variable, the Mouse Debit, and makes that value available for later sharing by segments downstream from it in the meta-page.

Similarly, this exemplary markup element:

<Alias inSeg="3" outSeg=" ">/miceNum</Alias> associates the Mouse Credit variable with the third of the three segments of dynamic content, for the Java alias "miceNum," as an input to the segment (inSeg "3"), and this exemplary markup element:

<Alias inSeg="3" outSeg=" ">/miceMinus</Alias> associates the Mouse Debit variable with the third of the three segments of dynamic content, for the Java alias "miceMinus," also as an input to the segment (in Seg="3"). The third segment therefore is illustrated in this example as one having two shared variable inputs from the meta-page and the meta-engine but no outputs of shared values back to the meta-engine.

The third dynamic segment administers mouse accounting with an interest in both the upside of it and also the downside, that is, both mouse decrements or debits and mouse increments or credits. The third dynamic segment, rather than initializing miceNum and miceMinus itself, reads their values from its input request object where they are deposited from their embodiment as encoded data in a calling URI issued by the meta-engine:

int myMiceNum=request.getParameter(miceNum);

int myMiceMinus=request.getParameter(miceMinus);

The third dynamic segment performs calculations using the passed values for miceNum and miceMinus and writes a result of those calculations to its standard output:

myMiceNum+=30;

myMiceMinus+=40 miceNet=miceNum−miceMinus out.println(miceNet+" blind mice.");

The third dynamic segment in this example does not, however, write the current values of miceNum or miceMinus to its standard output. As mentioned above, these shared variables are inputs to, but not outputs from, the third segment of dynamic content. This is an example in which no further segments below the third segment of dynamic content in the meta-page need the current values of miceNum or miceMinus, so that there is no need to recover their current values from the output of the last segment that uses them. This is also an example in which a shared value for one variable, the Mouse Credit, skipped a segment of dynamic content: it was used in the first segment (as mouseCount) and the third segment (as miceNum) but was not used at all in the second segment.

For further explanation of how the dynamic segments themselves are rendered, it is useful to return to the exemplary method of FIG. 5. The method of FIG. 5 includes writing (524) the dynamic content as rendered (534), at its location (526, 528) among the static content (504, 508), to the output (128) of the meta-engine (110). The dynamic content as rendered (534) includes additional dynamic content as rendered (536), included among rendered content only for the purpose of identifying to the meta-engine the current value of shared variables, and therefore not belonging on the output. The exemplary method of FIG. 5 therefore also includes reading (520) from the additional dynamic content as rendered (536) the current values (532) of shared variables and then deleting (522) from the dynamic content as rendered (534) the additional dynamic content as rendered (536).

Many meta-engines according to the method of FIG. 5, also extract from the meta-page and store in computer memory the identifications of shared variables, also providing a working storage location for the current values of shared variables, so that in reading (520) from the additional dynamic content as rendered (536) the current values (532) of shared variables, there is a convenient and useful place to store the values until they are needed in a later dynamic segment. In many meta-engines implementing a method according to FIG. 5, as explained in more detail above in this disclosure, rendering the dynamic content through dynamic server page engines includes writing, to one or more dynamic server pages, the dynamic content, including the additional dynamic content. In many meta-engines implementing a method according to FIG. 5, as explained in more detail above, dynamic content comprises a dynamic content type, and dynamic content inserted at one or more locations among the static content comprises segments of dynamic content of more than one type.

Meta-engines that implement the method of FIG. 5 by writing segments of dynamic content to dynamic server pages according to their type, typically construct a dynamic server page for each such segment of dynamic content and construct for each invocation of such dynamic server pages a URI, wherein each URI so constructed includes an identification of a particular dynamic server page and URI-encoded data comprising names and current values for shared variables for the particular dynamic server page. 'Constructing' dynamic server pages from segments of dynamic content can include installing by use, for example, of a file transfer protocol such as FTP, such dynamic server pages on file systems on servers having dynamic server page engines capable of rendering such pages. 'Constructing' and invoking such URIs can include opening TCP/IP connections to servers on which dynamic server page engines are installed and sending and receiving HTTP GET, POST, or RESPONSE messages.

The output streams from the dynamic server page engines rendering segments of dynamic content include not only the values of shared variables but also many values, text, other markup, and so on. It is useful, therefore, to have some way of identifying the shared values to be extracted by a meta-engine. In fact, the exemplary method of FIG. 5 includes a way of identifying shared values in an output stream from a dynamic page server engine. More particularly, the method of FIG. 5 includes inserting (516) into the dynamic content (506, 510) additional dynamic content (530) identifying current values of shared variables. Typically in the operation of meta-engines according to the method of FIG. 5, inserting (516) additional dynamic content (530) means inserting the additional dynamic content into each segment of dynamic content from which current values of shared variables are needed to be returned for later use by another segment of dynamic content farther down in a meta-page.

Some embodiments may hard code markers into the meta-engine or store predefined arrays of identifiers in a meta-engine for marking current return values in an output stream from a dynamic server page engine. Other ways of marking current return values will occur to those of skill in the art, and they are all well within the scope of the present invention. The exemplary meta-page illustrates a further example of providing markers for current return values in which the markers, rather than being predefined or hard coded, are instead provided in the markup identifying the shared variables. Here is the markup, from the example meta-page above, identifying the shared variables labeled Mouse Credit and Mouse Debit:

```
<SharVar id="Mouse Credit">
    <Alias inSeg="1" outSeg="1">mouseCount</Alias>
    <Alias inSeg="3" outSeg="">miceNum</Alias>
    <returnTagName>MouseCredit</returnTagName>
</SharVar >
<SharVar id="Mouse Debit">
    <Alias inSeg="" outSeg="2">mouseDown</Alias>
    <Alias inSeg="3" outSeg="">miceMinus</Alias>
    <returnTagName>MouseDebit</returnTagName>
</SharVar >
```

This example includes the markup:

<returnTagName>MouseCredit</returnTagName> and

<returnTagName>MouseDebit</returnTagName> identifying tag names for markup to be inserted as part of additional dynamic content to identify current values of shared variables in an output stream from a dynamic server page engine. In this example, the tag name "MouseCredit" is included as a tag name for use in identifying return values of the variable named mouseCount, and the tag name "MouseDebit" is included as a tag name for use in identifying return values of the variable named mouseDown. These tag names could be used also to identify return values for miceNum and miceMinus respectively, but in this example miceNum and miceMinus do not return current values to the meta-engine. Here is an example of additional dynamic content that includes the use of markup elements based upon these example tag names, one for a JSP segment using Java:

out.println("<MouseCredit>"+mouseCount +"</MouseCredit>");

and another example for an ASP segment using Visual Basic:

response.write "<MouseDebit>" &mouseDown "</MouseDebit>"

In this example, the meta-engine constructs the additional dynamic content in dependence upon the type values for the pertinent segments of dynamic content, respectively Java for a JSP engine for segment 1 and Visual Basic for an ASP engine for segment 2. Here is our current example meta-page as it appears after the step of inserting (516) into the dynamic content (506, 510) additional dynamic content (530) identifying current values of shared variables, using these exemplary lines of additional dynamic content and inserting them where they belong, respectively at the end of dynamic segments 1 and 2:

```
<HMML>
  <BODY>
    <SharVar id="Mouse Credit">
      <Alias inSeg="1" outSeg="1">mouseCount</Alias>
      <Alias inSeg="3" outSeg="">miceNum</Alias>
      <returnTagName>MouseCredit</returnTagName>
    </SharVar >
    <SharVar id="Mouse Debit">
      <Alias inSeg="" outSeg="2">mouseDown</Alias>
      <Alias inSeg="3" outSeg="">miceMinus</Alias>
      <returnTagName>MouseDebit</returnTagName>
    </SharVar >
    Static content
    <DynamicContent segType = "JSP" segID="1"> /* Java */
      int mouseCount = request.getParameter("mouseCount");
      mouseCount += 10;
      out.println(mouseCount + "blind mice.");
      out.println("<MouseCredit>" + mouseCount +
         "</MouseCredit>");
    </DynamicContent>
    Static content
    <DynamicContent segType="ASP" segID="2"> /* Visual Basic */
      dim mouseDown
      mouseDown = 20
      response.write &mouseDown "blind mice"
      response.write "<MouseDebit>" &mouseDown
         </MouseDebit>
    </DynamicContent>
    Static content
    <DynamicContent segType= "JSP" segID="3"> /* More Java */
      int myMiceNum = request.getParameter("miceNum");
      int myMiceMinus = request.getParameter("miceMinus");
      myMiceNum += 30;
      myMiceMinus += 40
      miceNet = miceNum – miceMinus
      out.println(miceNet + "blind mice.");
    </DynamicContent>
  </BODY>
</HMML>
```

The method of FIG. 5 includes rendering (518) the dynamic content (506, 510), including the additional dynamic content (530), through dynamic server page engines (512). If the value of mouseCount were 246 and the value of mouseDown were 132, then, when inserted as additional dynamic content, these examples result respectively in the following lines of output from dynamic server page engines:

<MouseCredit>246</MouseCredit>

<MouseDebit>132</MouseDebit>

The dynamic server engines (512) in this example are dynamic server engines other than a meta-engine and as such are typically installed on servers other than the one on which the calling meta-engine is installed. Rendering (518) the dynamic content (506, 510), including the additional dynamic content (530), through dynamic server page engines (512), therefore, typically also includes storing each segment of dynamic content in a separate dynamic server page file having an appropriate filename extension, transferring each such dynamic server page file to an appropriate file system location on the server on which a target dynamic server page engine is installed, invoking each such dynamic server page file so as to retrieve its dynamic content as rendered, and then politely deleting each such dynamic server page file from the target server, so as to refrain from clogging up the file system on the target server with such additional or ad hoc dynamic server page that might be used only once each.

As mentioned above, the method of FIG. 5 includes reading (520) from the additional dynamic content as rendered (536) the current values (532) of shared variables and deleting (522) from the dynamic content as rendered (534) the additional dynamic content as rendered (536). In this example, both shared values are needed later by a further segment of dynamic content, segment 3. The meta-engine in this example is programmed to scan its return input from each rendering dynamic server page engine for markup identifying a return value of a shared variable, extract and store for later use the current values of such shared variables, and then delete from the stream the markup identifying the return values. In this example, the line:

<MouseCredit>246</MouseCredit> appears in the return stream from the JSP engine rendering the first segment of dynamic content. The meta-engine, upon encountering this line in its scan of the return stream matches its tag name with a tag name known to the meta-engine as identifying the current value of the shared variable labeled Mouse Credit, extracts the current value of that variable '246,' stores it for later use, and then deletes the entire element <MouseCredit>246</MouseCredit> from the throughput stream directed to the meta-engine's standard output. In this example, the line:

<MouseDebit>132</MouseDebit> appears in the return stream from the ASP engine rendering the second segment of dynamic content. The meta-engine, upon encountering this line in its scan of the return stream matches its tag name with a tag name known to the meta-engine as identifying the current value of the shared variable labeled Mouse Debit, extracts the current value of that variable '132,' stores it for later use, and then deletes the entire element <MouseDebit>132</MouseDebit> from the throughput stream directed to the meta-engine's standard output. In both exemplary cases, it is useful to delete the entire element because the element and its value were inserted from the beginning only for the purpose of identifying a return value to the meta-engine. From the point of view of the segments of dynamic content (506, 510, 534, 528, 526), the elements of additional dynamic content (530, 536) are extra and inexistent. They do not belong in the output stream (528, 508, 526, 504, 128) comprising the meta-page as fully rendered back to its caller.

Rendering Non-JSP Segments of Dynamic Content Through Other Dynamic Server Page Engines Throughout the discussion so far in this disclosure, dynamic content generally has been sent for rendering into static content to dynamic server page engines other then a meta-engine, each such sending requiring a round trip of data processing and data communications with another dynamic server page engine. It would be advantageous to have ways of rendering at least some of the dynamic content into static content for output within the meta-engine itself, thereby reducing the processing and data communications burden with other dynamic server page engines and yielding an overall more efficient meta-engine. This disclosure now describes an approach to this issue that involves constructing a meta-engine on the foundation of an underlying JSP engine so that the meta-engine itself, in cooperation with its underlying JSP engine, renders into static HTML output the JSP dynamic content in a meta-page, sending only the non-JSP segments of dynamic content to other engines for processing. As described in more detail below, meta-engines constructed on a foundation of a JSP engine according to embodiments of the present invention continue to provide sharing of variable values across all types of dynamic content.

Figure 7:
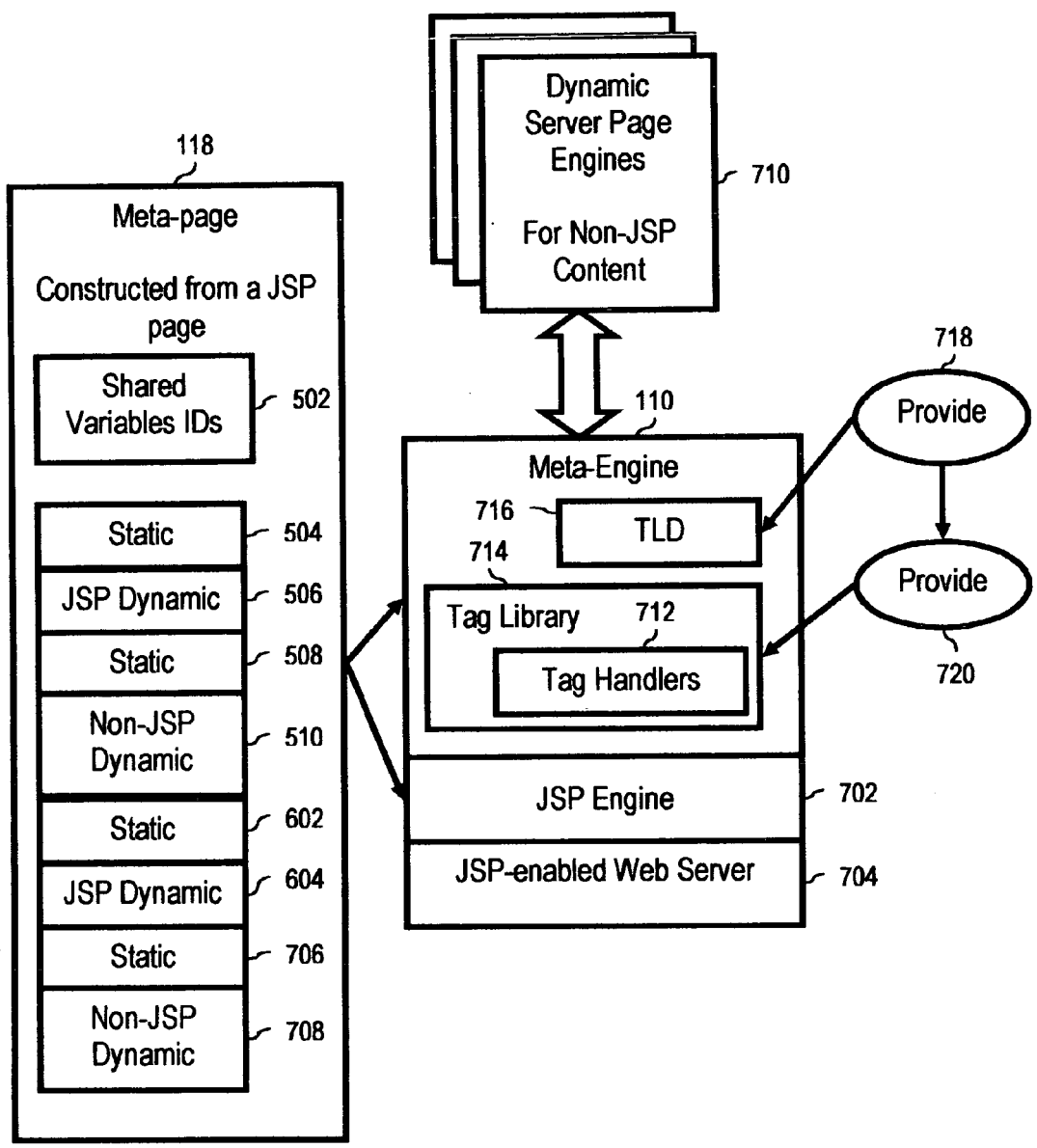
FIG. 7 sets forth a block diagram depicting an exemplary architecture for construction of meta-engines according to embodiments of the present invention.

FIG. 7 sets forth a block diagram depicting an exemplary architecture for construction of meta-engines according to embodiments of the present invention. In the architecture of FIG. 7, a meta-engine is implemented as a functional layer on a JSP engine (702) installed upon a JSP-enabled web server (704). The meta-engine and therefore the JSP engine accept a meta-page (118) as an input. The meta-engine is coupled for data communications to dynamic server pages engines (710) to which the meta-engine submits for rendering segments of non-JSP dynamic content (510, 708) from the meta-page (118). The JSP dynamic content (506, 604) from the meta-page (118) is rendered directly by the meta-engine (110) in conjunction with the JSP engine (702) rather than being sent to other dynamic server engines as is done with the non-JSP dynamic content.

In the exemplary architecture of FIG. 7, the meta-engine is constructed of a layer of functionality comprising a tag library descriptor ("TLD") (716) and a tag library (714) that includes tag handlers (712).

The construction and use of tag handlers is discussed below. A meta-page built out of a JSP page is advised that it is to make use of custom meta-tags by including within it a JSP directive identifying a pertinent TLD, such as, for example:

<%@ taglib uri="/WEB-INF/meta-tags.tld" prefix="mt" %>

The uri attribute sets forth a URI that uniquely identifies a TLD for the meta-tags to be used in a particular implementation of a meta-engine. The prefix attribute sets forth a prefix for distinguishing tags whose behaviors, tag handlers, are identified through a particular tag library, so that if custom meta-tags <ASP-Content> and <CGI-Content> are so distinguished, then they are written in a meta-page as <mt:ASP-Content> and <mt:CGI-Content> respectively, the "mt" used here because of its mnemonic quality for 'meta-tag.'

A TLD is an XML document that describes a tag library. A TLD contains information describing a tag library as a whole and also contains information describing each tag for which a tag handler is established in the library described by the TLD. The TLD identifies to a JSP engine which tag handler to call upon encountering a tag described in the TLD. TLDs are stored in files having a .tld file name extension. Each TLD begins with an XML document prolog specifying a version of XML and a document type definition ("DTD") for the TLD, as shown, for example, in the following exemplary TLD:

```
<?xml version="1.0" encoding="ISO-8859-1" ?>
<!DOCTYPE taglib PUBLIC "-//Sun Microsystems, Inc.//DTD JSP Tag
Library 1.2//EN" "http://java.sun.com/dtd/web-jsptaglibrary_1_2.dtd">
<taglib>
   <tlib-version>1.0</tlib-version>
   <jsp-version>1.2</jsp-version>
```

-continued

```
<tag>
   <name>ASP-Content</name>
   <tag-class>taglib.ASPContentHandler</tag-class>
   <body-content>tagdependent</body-content>
</tag>
<tag>
   <name>CGI-Content</name>
   <tag-class>taglib.CGIContentHandler</tag-class>
   <body-content>tagdependent</body-content>
</tag>
</taglib>
```

The root of the TLD is the <taglib> element. In this example, the information describing the tag library generally is the version number of the tag library in the <tlib-version> element and the version number of JSP needed by the tag library as set forth in the <jsp-version> element. For marking non-JSP dynamic content in a meta-page, this example describes two meta-tags, one for marking ASP dynamic content and one for marking CGI dynamic content. The meta-tags identified in the TLD are implemented as so-called 'JSP Custom Tags' within the meaning of the standard Java documentation. These meta-tags, their identification in TLDs, and the processing of their marked dynamic content in tag handlers is described in this disclosure at the level of detail required to enable persons of skill in the art to make and use various exemplary embodiments of the present invention. Readers wishing to know more about JSP Custom Tags are referred to the Java documentation on the Sun Microsystems website. Because these custom tags are used to mark segments of dynamic content in meta-pages, they are sometimes referred to in this disclosure as 'meta-tags.'

In this example, each meta-tag is described by the sub-element <name> which sets forth a unique name for each tag. Each meta-tag is also described by a subelement named <tag-class> setting forth the fully-qualified class name of the tag handler class to be called upon encountering the identified meta-tag during the processing of a meta-page. Each meta-tag is also described by a subelement named <body-content> whose value "tagdependent" indicates that the body of the meta-tag is non-JSP content, such as, for example, a SQL query, ASP content, CGI content, and so on. The value "tagdependent" also implies that the body of the meta-tag (i.e., non-JSP dynamic content) is content that cannot be rendered directly by the underlying JSP engine, content with which something else is to be done. In embodiments of this invention, the something else that is to be done generally is that the non-JSP content is to be handed off to a tag handler that will cause it to be rendered by some other dynamic page server engine, an ASP engine, a CGI engine, and so on, as appropriate, and then return the rendered non-JSP dynamic content to the underlying JSP engine for routing to output as static HTML content. It is useful, therefore, for tag handlers to have access to the segments of dynamic content marked by their meta-tags because it is the tag handlers that are to carry out upon the segments of dynamic content the meta-engine functions of inserting additional dynamic content for identifying shared variables, writing the segment to a dynamic server page engine for rendering its type of dynamic content, retrieving values of shared variables from the content as rendered, deleting the additional markup, and so on, as described in more detail below.

An exemplary method for making a meta-engine is also described by use of FIG. 7, which sets forth a small data flow diagram depicting such a method. The method of FIG. 7 for making a meta-engine comprises providing (718) a TLD (716) mapping tag handlers (712) in a tag handler library (714) to meta-tags each of which identifies a type of dynamic markup. The mapping is implemented as described just above, by use of <tag> elements in the TLD, such as, for example:

```
<tag>
   <name>ASP-Content</name>
   <tag-class>taglib.ASPContentHandler</tag-class>
   <body-content>tagdependent</body-content>
</tag>
```

Providing (718) the TLD (716) is carried out by a programmer's typing the TLD into an XML file and storing it in a conventional location on the web server (704) in a file having a .tld file name extension.

The method of FIG. 7 for making a meta-engine also includes providing (720) the tag handler library (714) comprising a tag handler (712) for each type of non-JSP dynamic content supported by the meta-engine, wherein each tag handler comprises an identification of a dynamic server page engine for rendering one type of non-JSP dynamic content, and each tag handler is programmed to carry out the processing steps of typical embodiments of the present invention including identifying shared variables and current values of shared variables; inserting additional non-JSP dynamic content identifying current values of shared variables; rendering non-JSP dynamic content through dynamic server page engines; reading from non-JSP additional dynamic content as rendered the current values of shared variables; deleting additional non-JSP dynamic content as rendered; and so on.

A tag handler is an object invoked by a Java-enabled web server, or more particularly, a Java web container on a Java-enabled web server, to evaluate a custom tag (in this disclosure, a 'meta-tag') during execution of a JSP page that references the tag. Tag handlers by definition within the Java standard implement either the standard Java interface "Tag" or "BodyTag." In meta-engines, the body of a meta-tag is generally the dynamic content marked by the meta-tag, and the usual purpose of the tag handler for the meta-tag is to manipulate the dynamic content, the body of the meta-tag, by inserting additional non-JSP dynamic content; rendering non-JSP dynamic content (the body) through dynamic server page engines; reading from the body as rendered current values of shared variables; deleting additional non-JSP dynamic content as rendered from the body, and so on. Because tag handlers for meta-tags typically manipulate the body of their associated meta-tags, tag handlers in typical embodiments of the present invention usually implement the Java interface "BodyTag." For convenience in developing new tag handlers, Java provides utility classes called respectively "TagSupport" and "BodyTagSupport," and, because of the general need to manipulate the body of associated meta-tags, to the extent that such utility classes are used to develop new tag handlers among embodiments of the present invention, the utility class so utilized is usually "BodyTagSupport." These Java standard interfaces and utility classes are contained in the Java standard package "javax.servlet.jsp.tagext."

Tag handler methods defined by the "BodyTag" interface are called by a meta-engine's underlying JSP engine at various points during evaluation of a meta-tag. When the start tag of a meta-tag is encountered, the underlying JSP engine (now in its aspect of a Java servlet compiled from the meta-page) initializes the appropriate tag handler and invokes its doStartTag( ) method. In developing a tag handler for a meta-tag, it is usual to override the doStart Tag( ) method from the "BodyTag" interface to return EVAL_BODY_BUFFERED, signifying to the underlying JSP engine that the body of the meta-tag is to be made available for processing by the tag handler.

Before attempting to evaluate the body (segment of non-JSP dynamic content) marked by a meta-tag, the underlying JSP engine calls the tag handler method doInit Body( ). In developing a tag handler for a meta-tag, a developer typically overrides doInitBody( ) to carry out the actual work of manipulating a segment of dynamic content, the body of the meta-tag, by inserting additional non-JSP dynamic content; rendering non-JSP dynamic content (the body) through a dynamic server page engine (other than the underlying JSP engine); reading from the body as rendered current values of shared variables; deleting additional non-JSP dynamic content as rendered from the body, and so on. Here as an aid to explanation is a pseudocode example of a tag handler for ASP dynamic content:

```
public ASPContentHandler extends BodyTagSupport {
   // IP address for an ASP engine
   String ASP-IPaddr = "168.192.005.123"
   // Pathname for an ASP dynamic server page
   // to be created by this tag handler
   String ASP-pathname = "/aspSubdirectory/aspDynamicContent.asp"
   // signal that the meta-tag body is needed by the tag handler
   public int doStartTag( ) { return EVAL_BODY_BUFFERED; }
   // process the body as non-JSP dynamic content
   public int doInitBody( ) {
      // obtain a copy of the body for processing
      Bodycontent bc = getBodyContent( );
      // convert the body to string form
      String bodyString = bc.getString( );
      // read shared variable information from its Java
      // structure or array (SharVar) in the meta-page;
      SharVarClass sharVarValues = read_shared_variables(SharVar);
      // insert additional dynamic content
      bodyString = insertAddlDynContent(bodyString, sharVarValues);
      // render the ASP content through an ASP engine
      ftp_send(ftpScriptName, ASP-IPaddr, ASP-pathname, bodyString);
      Socket aspSocketID = open_tcp_connection(ASP-IPaddr, Port 80);
      tcp_send(aspSocketID, bodyString); // HTTP GET
      bodyString = tcp_receive(aspSocketID); // HTTP RESPONSE
      ftp_delete(ASP-pathname);
      // extract and update shared variable values
      sharVarValues = extractSharVars(bodyString);
      write_shared_variables(SharVar, SharVarValues);
      bodyString = deleteAdditionalDynContAsRendered(bodyString):
      // send body as a string to output
      JspWriter out = bc.getEnclosingWriter( );
      out.println(bodyString);
      // clear the body at the body object level, prevent
      // further evaluation by an underlying JSP engine
      bc.clearbody( );
   }
   // signal no further iterations
   public int doAfterBody( ) { return SKIP_BODY; }
   // signal continue evaluating the meta-page
   public int doEndTag( ) { return EVAL_PAGE; }
   release( ) {} // reset state, release any private resources
}
```

An exemplary meta-engine's underlying JSP engine can operate this exemplary tag handler, "ASPContentHandler," by calling in sequence doStartTag( ), doInitBody( ), doAfterBody( ), doEndTag( ), and release( ). Between the calls to doInitBody( ) and doAfterBody, the underlying JSP engine evaluates the body of the pertinent meta-tag. The effect of doStartTag( ) is described above. The operation of doInit-Body( ) for this example is explained below.

The effects of doAfterBody( ), doEndTag( ), and release( ) are explained here: The method doAfterBody( ) is called by the underlying JSP engine after evaluation of the body of the meta-tag. The underlying JSP engine, if asked to do so, will iteratively evaluate the body of the meta-tag more than once. In this example, doAfterBody( ) is overridden only to return SKIP_BODY, signaling to the underlying JSP engine that no iterations of evaluation are required.

The method doEndTag( ) is called by the underlying JSP engine when the end tag of the meta-tag is encountered in processing the meta-page. The end tag of the meta-tag marks the end of a segment of non-JSP dynamic content. If asked to do so, the underlying JSP engine will cease processing of the meta-page entirely at this point. In this example, doEnd-Tag( ) is overridden only to return to the underlying JSP engine a signal, EVAL PAGE, that the underlying JSP engine is to continue normal processing of the remainder of the meta-page.

The release( ) method is called by the underlying JSP engine at the end of processing for a tag handler to give the tag handler an opportunity to reset its state and release any resources it might have used during the previous calls to other member methods. In this example, the release method is presented as an exemplary place holder, overridden to do nothing.

Clearly the method doInitBody( ) is the workhorse of the exemplary tag handler ASPContentHandler. The method doInitBody( ) is described in more detail below, but before considering that more detailed description, note that doInit-Body( ) reads the shared variables it is to administer:

SharVarClass        sharVarValues=read_shared_variables (SharVar);

from an array named SharVar that doInitBody( ) has access to because it is so scoped. That is, the variable sharing access scope of doInitBody( ), as a member method in a tag handler, has access to the values of variables and objects defined or initializd by segments of Java code in the meta-page to which the tag handler is related.

Figure 8:
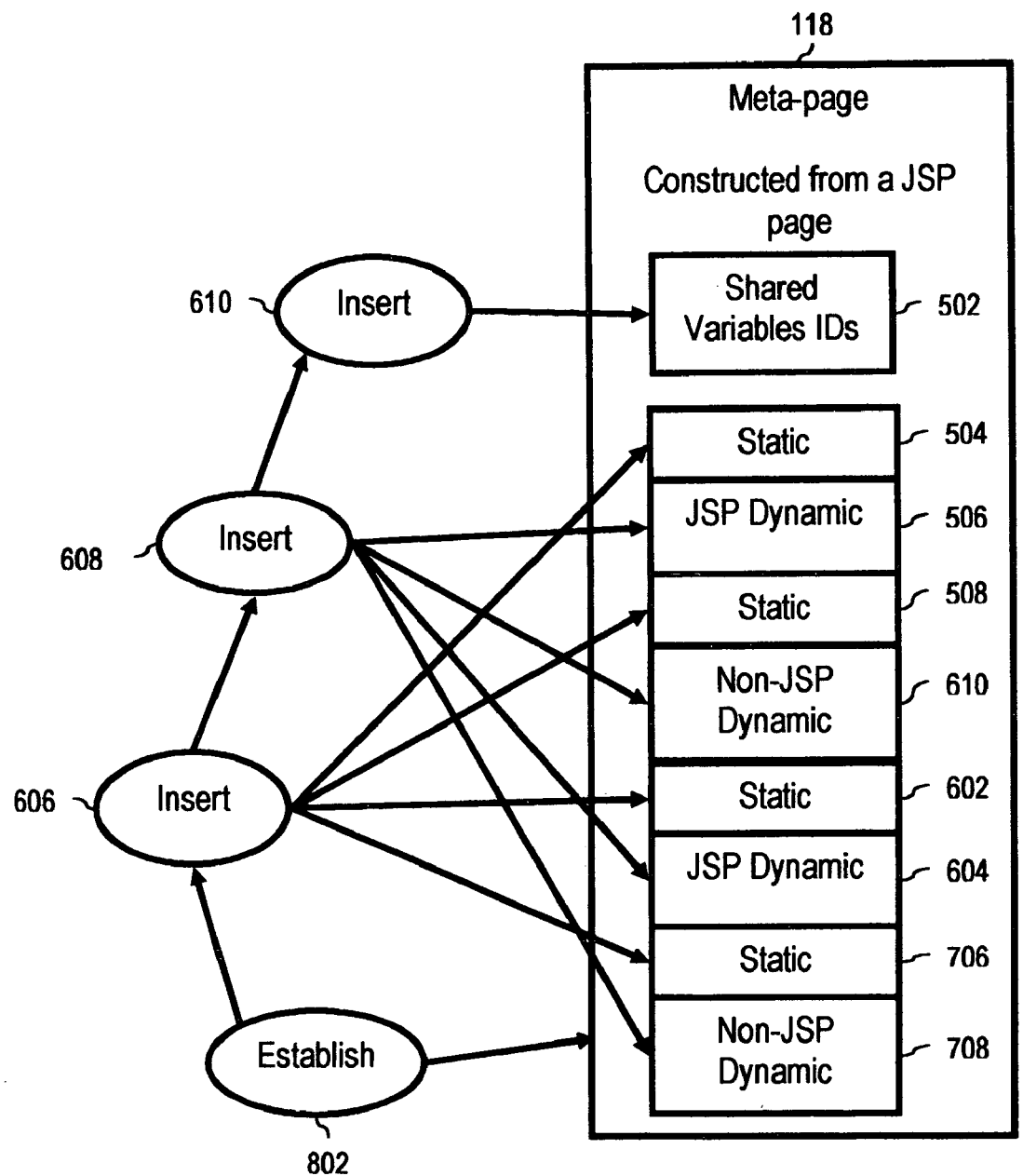
FIG. 8 sets forth a data flow diagram illustrating a method for creating a meta-page.

FIG. 8 sets forth a data flow diagram illustrating a method for creating such a meta-page. The method of FIG. 8 includes establishing (802) a JSP dynamic server page as the meta-page (118), a step that is typically carried out by opening a text document and storing it with a .jsp filename extension in a subdirectory on a web server designated for storing JSP pages. The method of FIG. 8 then includes inserting (606) static content (504, 508, 602, 706) into the meta-page (118), a step carried out by typing into the meta-page through a text editor or word processor static HTML content. The method of FIG. 8 also includes inserting (608) JSP dynamic content (506, 604) and one or more types of non-JSP dynamic content (510, 708) at two or more locations among the static content, a step that is often carried out by typing into the meta-page through a text editor or word processor segments of JSP dynamic content and non-JSP dynamic content, marking each type of dynamic content with appropriate markup. Appropriate markup for JSP dynamic content is standard JSP syntax: <% %> for Java code scriptlets, <%@ %> for JSP directives, <%-- --%> for JSP comments, and so on. Appropriate markup identifying segments of non-JSP dynamic content is provided by meta-tags according to embodiments of the present invention, <mt:ASP-Content>, <mt:CGI-Content>, <mt:Perl-Content>, <mt:PHP-Content>, <mt:Python-Content>, <mt:ColdFusion-Content>, and so on.

The method of FIG. 8 also includes inserting (610) into the meta-page identifications (502) of shared variables. In typical meta-pages according to embodiments of the present invention, inserting (502) identifications of shared variables further comprises inserting into the meta-page Java code identifying shared variables. In typical meta-pages according to the present invention, inserting Java code identifying shared variables includes inserting Java code associating shared variables with segments of non-JSP dynamic content. In typical meta-pages according to embodiments of the present invention, inserting Java code identifying shared variables includes inserting Java code associating shared variables with input and output to and from segments of non-JSP dynamic content. The method of FIG. 8 is further explained by use of the following exemplary pseudocode:

```
<%
    protected String [ ] [ ] SharVars {
        {"1", "mouseCount", "BOTH", "MouseCredit", ""}
        {"2", "mouseDown", "OUT_ONLY", "MouseDebit", ""}
        {"3", "miceNum", "IN_ONLY", "", ""}
        {"3", "miceMinus", "IN_ONLY", "", ""}
    }
%>
``` which implements an array of string arrays in a JSP Java scriptlet. This arrary is explained by assigning mnemonics to its substructure with the following example, assuming that SharVars is in effect an array of SharVar:

```
Struct SharVar{
    String segID; // unique for each segment, because
        // we can have more than one ASP seg, etc.
    String name; // alias name within the segment
    String sharVarDir; // IN_ONLY, OUT_ONLY, or BOTH
    String returnTagName;
    String currentValue;
}
```

That is, each line of SharVars,
    {"1", "mouseCount", "BOTH", "MouseCredit", ""},
    {"2", "mouseDown", "OUT_ONLY", "MouseDebit", ""}, and so on, implements an instance of the structure SharVar, setting forth in data:
- a segment identification for a segment of dynamic content in which a particular variable is shared ("1", "2", and so on);
- an alias name for the variable in the segment ("mouseCount", "mouseDown", and so on);
- an indication whether the variable is needed on the input of the segment, the output of the segment, or both (IN_ONLY, OUT_ONLY, BOTH);
- a return string tag name for use in formulating additional non-JSP dynamic content for the segment ("MouseCredit", "MouseDebit"); and
- a computer memory location for storing the current value of the variable between calls to various segments of dynamic content ("", "", all blank in this example because no values are yet established).

As mentioned above, the workhorse doInitbody( ) method of the exemplary tag handler ASPContentHandler usefully acquires the values of shared variable from a data structure such as that described just above as SharVars. In this example, SharVars is set forth in a Java scriptlet whose data members are scoped to permit access to member methods in tag handlers such as doInitBody( ).

Figure 9:
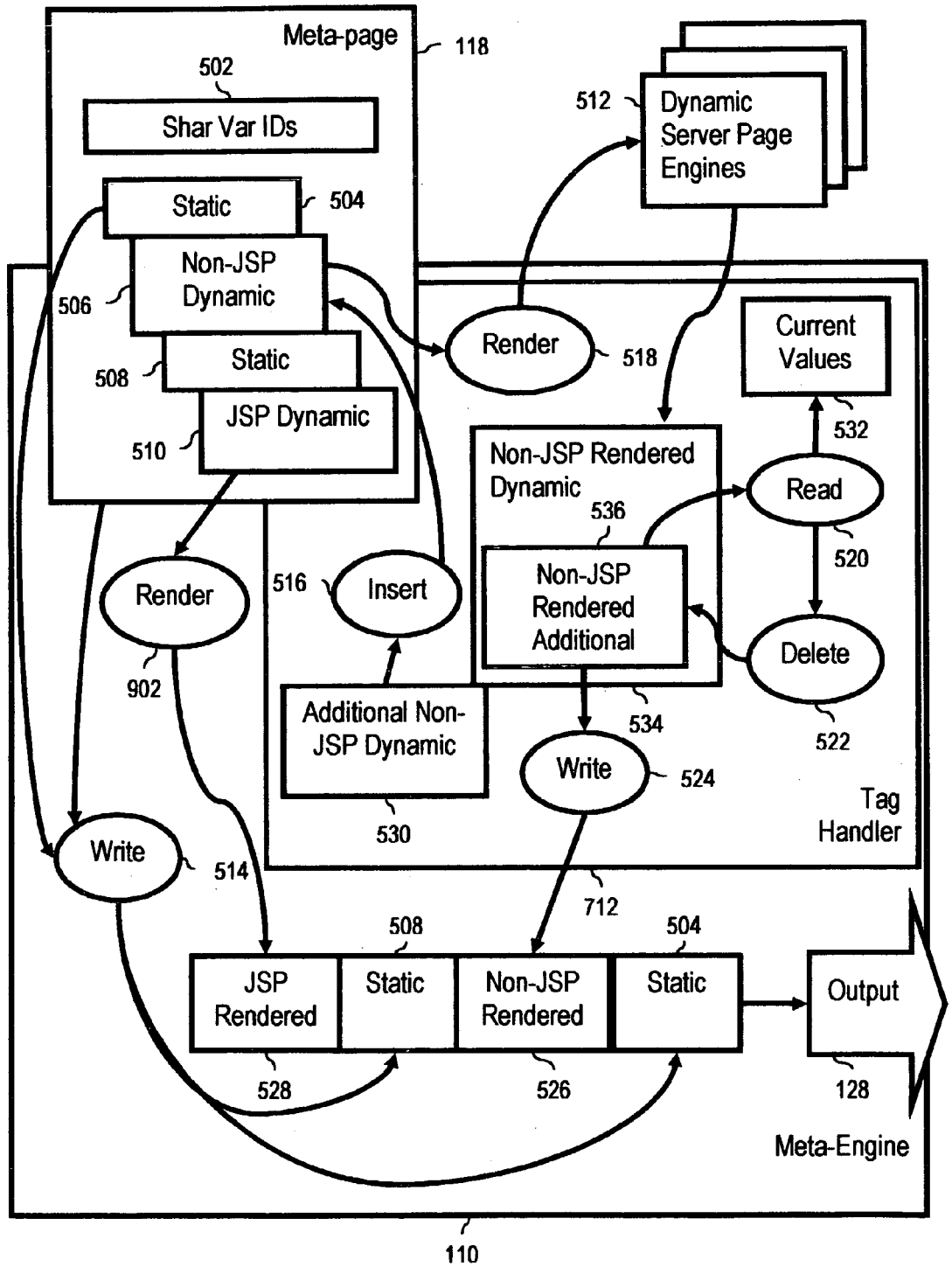
FIG. 9 sets forth a method for rendering a meta-page through a meta-engine comprising a tag handler.

The operations of the exemplary doInitBody( ) method set forth above are now explained in more detail, with reference to FIG. 9. FIG. 9 sets forth a method for rendering a dynamic server meta-page ("a meta-page") (118) through a dynamic server page meta-engine ("a meta-engine") (110) comprising a tag handler (712), the meta-page comprising static content (504, 508), JSP dynamic content (510) and one or more types of non-JSP dynamic content (506) inserted at two or more locations among the static content, and identifications (502) of shared variables.

The method of FIG. 9 includes writing (514), to an output (128) of the meta-engine (110), the static content (504, 508) of the meta-page (118) and also includes rendering (902) the JSP dynamic content (510), at its location (528) among the static content (504, 508), to the output (128) of the meta-engine (110). The meta-page (118) in this example is presented to an underlying JSP engine as a JSP page which is compiled into a servlet that automatically sends the static HTML content of the page to its output and automatically renders or evaluates JSP content, thereby generating static HTML content, and sends that resulting static HTML, that is, the JSP dynamic content as rendered, to its output. Here is a pseudocode example of a meta-page comprising static content, JSP content, and also non-JSP content (i.e., ASP content):

```
<%
    protected String [ ] [ ] SharVars {
        {"1", "mouseCount", "BOTH", "MouseCredit", ""}
        {"2", "mouseDown", "OUT_ONLY", "MouseDebit", ""}
        {"3", "miceNum", "IN_ONLY", "", ""}
        {"3", "miceMinus", "IN_ONLY", "", ""}
    }
%>
Static content
<%      /* first segment of JSP content - written in Java */
    int mouseCount = (int) Integer.parseInt(SharVars[0][4]);
    mouseCount += 10;
    out.println(mouseCount + "blind mice.");
%>
Static content
<mt:ASP-Content id="2"> /* Visual Basic */
    dim mouseDown
    mouseDown = 20
    response.write &mouseDown "blind mice"
</mt:ASP-Content>
Static content
<%      /* second segment of JSP content - written in Java */
    int miceNum = (int) SharVars[0][4];
    int miceMinus = (int) SharVars[0][4];
    miceNum += 30;
    miceMinus += 40
    miceNet = miceNum - miceMinus
    out.println(miceNet + "blind mice.");
%>
```

In this pseudocode example of a meta-page, the SharVars array is the array of string arrays for identifying shared variables described above in this disclosure. This exemplary meta-page denotes three instances of static content to be directed to output and two segments of JSP content (marked as JSP scriptlets by <% and %>) to be rendered or evaluated with their content as rendered directed to output as denoted by the two out.println( ) statements in the pseudocode.

The method of FIG. 9 includes inserting (516) into the non-JSP dynamic content (506) additional non-JSP dynamic content (530) identifying current values of shared variables.

Identifying current values of shared variables in this context is identifying the values of shared variables in the returning output of a non-JSP dynamic server page engine (512) to which the non-JSP content is sent to be rendered. In the current example illustrated by the exemplary meta-page just above and the doInitBody( ) method in the exemplary tag handler ASPContentHandler, inserting (516) into the non-JSP dynamic content (506) additional non-JSP dynamic content (530) identifying current values of shared variables is carried out by the following pseudocode line in doInitBody( ):

bodyString=insertAdd1DynContent(bodyString, sharVarValues);

where insertAdd1DynContento is programmed to retrieve from SharVars the return tag name <MouseDebit>, retrieve and parse to text the current value of the variable identified by the alias mouseDown, and concatenate the following line of code to be inserted into the segment of ASP content at or near the end of the segment:

response.write "<MouseDebit>" &mouseDown "</MouseDebit>"

so that the segment of non-JSP content formerly appearing as:

```
<mt:ASP-Content id="2"> /* Visual Basic */
    dim mouseDown
    mouseDown = 20
    response.write &mouseDown "blind mice"
</mt:ASP-Content>
``` now appears as:

```
<mt:ASP-Content id="2"> /* Visual Basic */
    dim mouseDown
    mouseDown = 20
    response.write &mouseDown "blind mice"
    response.write "<MouseDebit>" &mouseDown "</MouseDebit>"
</mt:ASP-Content>
```

The method of FIG. 9 includes rendering (518) the non-JSP dynamic content (506), including the additional non-JSP dynamic content (530), through dynamic server page engines (512), including passing current values of shared variables to the dynamic server page engines. In many embodiments of meta-engines according to embodiments of the present invention, rendering (518) non-JSP dynamic content through dynamic server page engines includes writing, from a tag handler to a dynamic server page, non-JSP dynamic content, including the additional non-JSP dynamic content; storing the new dynamic server page with an appropriate filename extension (in this case, .asp) in a location accessible to a dynamic server page engine capable of rendering the content; and invoking that dynamic server page engine (512) to render the non-JSP dynamic content.

In the particular example under discussion, the non-JSP segment is the segment of dynamic content in the exemplary meta-page identified by the meta-tag <mt:ASP-Content>. In this example, the pseudocode line:

ftp_send(ftpScriptName, ASP-IPaddr, ASP-pathname, bodystring);

calls a member method named ftp_send( ) that creates from the body of the non-JSP segment a file having a .asp filename extension (in fact, in this example, a file named "aspDynamicContent.asp," as described above in ASPContentHandler.ASP-pathname) and transfers the file by use of an FTP script named "ftpScriptName" via the File Transfer Protocol to a server identified by the IP address stored in ASP-PDaddr at the location on that server identified by the string stored in ASP-pathname.

In the particular example under discussion, the meta-engine invokes the dynamic server page engine (512) that is capable of rendering the non-JSP content with the following lines from doInitBody( ):

Socket aspSocketID=open_tcp_connection(ASP-IPaddr, Port 80);
   tcp_send(aspSocketID, bodyString); // HTTP GET By opening a tcp/ip socket and transmitting an HTTP GET message to a server capable of rendering the ASP content, that is, to a server upon which is installed an ASP engine, doInitBody( ) effectively invokes a URI that identifies the new .asp file as a resource to be invoked and rendered from the ASP engine or its server back to the caller, the tag handler ASPContentHandler. The exemplary method doInitBody( ) retrieves the non-JSP content as rendered by calling bodyString=tcp_receive(aspSocketID); // HTTP RESPONSE which listens on the socket aspSocketID for a returning HTTP RESPONSE message, extracts from the HTTP message the body of the non-JSP segment as rendered, and stores it in the string "bodyString." In order to be a good citizen of cyberspace, doInitBody( ) through its call to ftp_delete(ASP-pathname);

also deletes from the server with the ASP engine the .asp file containing the non-JSP content just rendered. Without such deletion, non-JSP content from meta-engines could pile up uselessly on the ASP server in question. Strictly speaking, however, this description of such a deletion is explanatory and optional rather than a limitation of the present invention.

The method of FIG. 9 includes reading (520) from the non-JSP additional dynamic content as rendered (534) the current values of shared variables (532). In this example, the non-JSP additional dynamic content as rendered is the ASP engine output generated by the following earlier insertion from the meta-engine into the ASP content:

response.write "<MouseDebit>" &mouseDown "</MouseDebit>"

which appears in the ASP engine's output stream and therefore in the HTTP RESPONSE message and in the bodyString variable retrieved and stored by bodyString=tcp_receive(aspSocketID); // HTTP RESPONSE as:

<MouseDebit>20</MouseDebit> because the current value of mouseDown is 20. Reading (520) from the non-JSP additional dynamic content as rendered (534) the current values of shared variables (532), in this example, therefore, is carried out by doInitBody( ) through its calls to sharVarValues=extractSharVar's(bodyString);
   write_shared_variables(SharVar, SharVarValues);

EstractSharVars( ) is programmed to scan through the bodyString for the tag <MouseDebit>, extract its element body (20), and store it in an interim storage location named sharVarValues. The pseudocode does not explicitly show this, but in this example, sharVarValues could simply be an integer variable now having the integer value 20. Or extractSharVars( ) can extract the body of <MouseDebit> and leave it in string form, because, in this example at least, its ultimate target storage location, SharVar, is an array of strings. Write_shared_variables( ) is programmed to conduct the actual step of returning the current value of the shared variable to its principal storage location, in this case, SharVar[1][4].

The method of FIG. 9 includes deleting (522) from the non-JSP dynamic content as rendered (536) the additional non-JSP dynamic content as rendered (536), carried out in the current example of doInitBody( ) by its call to bodyString=deleteAdditionalDynContAsRendered(bodyString).

The method deleteAdditionalDynContAsRendered( ) is programmed to scan through bodyString for tags marking additional non-JSP dynamic content as rendered from additional non-JSP dynamic content inserted earlier in processing by the meta engine. In this example, deleteAdditionalDynContAsRendered( ) finds in bodyString the tag <MouseDebit> and deletes its start tag <MouseDebit>, its body "20", and its end tag </MouseDebit>. This additional non-JSP dynamic content as rendered is present in bodyString only for purposes of identifying to the meta-engine the current value of a shared variable and therefore does not belong in the final rendered output of the meta-page.

The method of FIG. 9 includes writing (524) the non-JSP dynamic content as rendered (526), at its location among the static content (504, 508), to the output (128) of the meta-engine (110), in this example accomplished by the call to out.println(bodyString).

According to the Java standard, an underlying JSP engine, after its call to doInitBody( ), evaluates the body of the meta-tag associated with doInitBody( )'s tag hander, in this example, ASPContentHandler. In the example under discussion, however, the body of the meta-tag, the subject non-JSP content, the ASP content, has already been evaluated by an ASP engine and rendered directly to output. There is therefore no need for further evaluation by the underlying JSP engine and further attempts at evaluation are prevented in this example by doInitBody( )'s call to bc.clearbody( ). That is, at this point in processing, the underlying JSP engine that might ordinarily otherwise evaluate the body of a meta-tag marking non-JSP dynamic content now stored in the Bodycontent object here named "bc," now cannot do so because the body, having already been rendered and passed to output by out.println(bodyString), is now empty, cleared by the call to bc.clearbody( ).

The advantages of meta-pages fashioned to work on meta-engines built on foundations of JSP engines are now clear to readers of skill in the art. Consider again our earlier example of programmers hired to convert ASPs to JSPs. Programmers using this class of embodiments, embodiments in which the meta-engine is built on a JSP engine foundation, however, are empowered to change the filename extension of an existing ASP page from .asp to .jsp, mark the existing ASP content with meta-tags, identify shared variables in some structure provided for that purpose such as the exemplary array named SharVars, and then proceed to program freely with additional static HTML content and dynamic JSP content. Because the shared variables in such embodiments typically are identified in Java structures, all JSP segments of dynamic content share them automatically. Moreover, no additional effort is require to share even complex variables across the Java segments of dynamic content in a meta-page. In addition, because JSP segments of dynamic content are rendered directly by the meta-engines underlying JSP engine, only non-JSP segments of dynamic content need be rendered by engines other than the underlying JSP engine of a meta-engine, making overall processing of meta-pages according to this class of embodiments of the present invention more efficient.

Programmers using this class of embodiments, in converting ASPs, for example, to meta-pages, need only open the ASPs in their editors, tag off the dynamic content to be rendered by ASP engines, identify their shard variables in a data structure known to a meta-engine, and then start programming, entering both additional static content as well as new Java-oriented dynamic content which would in other embodiments need to be rendered by a separate JSP engine but in this class of embodiments is rendered directly by the meta-engine or its underlying JSP engine. Filename extensions of '.asp' are changed to '.jsp,' but all existing ASP content remains unchanged, needing no recoding into Java, for example, a tremendous savings in converting large systems from ASP to JSP. Although this disclosure discusses examples mainly in terms of ASP and JSP, in fact, transitions from any kind of non-JSP content is well within the scope of the present invention. And any such transition is greatly eased by use of various embodiments of the present invention.

It is clear from the wide range of exemplary embodiments described that there are many, many embodiments within the scope of the present invention. It will be understood from the foregoing description that various modifications and changes can and will be made in the exemplary embodiments of the present invention without departing from the true spirit of the present invention. The descriptions in this specification are for purposes of illustration only and are not to be construed in a limiting sense. The scope of the present invention is limited only by the language of the following claims.

What is claimed is:

1. A method for rendering a dynamic server meta-page ("a meta-page") through a dynamic server page meta-engine ("a meta-engine") comprising a tag handler, the meta-page comprising static content, JSP dynamic content and one or more types of non-JSP dynamic content inserted at two or more locations among the static content, and identifications of shared variables, the method comprising:
   writing, to an output of the meta-engine, the static content of the meta-page;
   rendering the JSP dynamic content, at its location among the static content, to the output of the meta-engine;
   inserting into the non-JSP dynamic content additional non-JSP dynamic content identifying current values of shared variables;
   rendering the non-JSP dynamic content, including the additional non-JSP dynamic content, through dynamic server page engines, including passing current values of shared variables to the dynamic server page engines;
   reading from the non-JSP additional dynamic content as rendered the current values of shared variables;
   deleting from the non-JSP dynamic content as rendered the additional non-JSP dynamic content as rendered; and
   writing the non-JSP dynamic content as rendered, at its location among the static content, to the output of the meta-engine.

2. The method of claim 1 further comprising identifying shared variables and current values of shared variables for the tag handler; and
   wherein the tag handler further comprises a tag library descriptor mapping tag handlers in a tag handler library to meta-tags each of which identifies a type of dynamic markup,
   wherein the tag handler library further comprises a tag handler for each type of non-JSP dynamic content supported by the meta-engine, wherein each tag handler comprises an identification of a dynamic server page engine for rendering one type of non-JSP dynamic content, and
   wherein rendering the non-JSP dynamic content through dynamic server page engines further comprises
   writing, from a tag handler to a dynamic server page, non-JSP dynamic content, including the additional non-JSP dynamic content; and
   invoking a dynamic server page engine to render the non-JSP dynamic content.

3. A method for making a meta-engine, the method comprising:
   providing a tag library descriptor mapping tag handlers in a tag handler library to meta-tags each of which identifies a type of dynamic markup;
   providing the tag handler library comprising a tag handler for each type of non-JSP dynamic content supported by the meta-engine, wherein each tag handler comprises an identification of a dynamic server page engine for rendering one type of non-JSP dynamic content, and each tag handler is programmed to carry out the steps of:
   identifying shared variables and current values of shared variables for the tag handler;
   inserting into non-JSP dynamic content additional non-JSP dynamic content identifying current values of shared variables;
   rendering non-JSP dynamic content, including the additional non-JSP dynamic content, though dynamic server page engines, including passing current values of shared variables to the dynamic server page engines;
   reading from the non-JSP additional dynamic content as rendered the current values of shared variables;
   deleting from the non-JSP dynamic content as rendered the additional non-JSP dynamic content as rendered; and
   writing the non-JSP dynamic content as rendered, at its location among the static content, to the output of the meta-engine.

4. A method for creating a meta-page, the method comprising:
   establishing a JSP dynamic server page as the meta-page;
   inserting static content into the meta-page;
   inserting JSP dynamic content and one or more types of non-JSP dynamic content at two or more locations among the static content, wherein the JSP dynamic content can be rendered through a dynamic server page meta-egine, and the one or more type of non-JSP dynamic content can be rendered through dynamic server page engines; and
   inserting into the meta-page identifications of shared variables, including inserting into the meta-page Java code identifying shared variables,
   wherein inserting Java code identifying shared variables further comprises:
   inserting Java code associating shared variables with segments of non-JSP dynamic content; and
   inserting Java code associating shared variables with input and output to and from segments of non-JSP dynamic content.

5. A system for rendering a dynamic server meta-page ("a meta-page") though a dynamic server page meta-engine ("a meta-engine") comprising a tag handler, the meta-page comprising static content, JSP dynamic content and one or more types of non-JSP dynamic content inserted at two or more locations among the static content, and identifications of shared variables, the system comprising a computer processor and a computer memory operatively coupled to the computer processor, the computer memory having disposed within it computer program instructions capable of:
- writing, to an output of the meta-engine, the static content of the meta-page;
- rendering the JSP dynamic content, at its location among the static content, to the output of the meta-engine;
- inserting into the non-JSP dynamic content additional non-JSP dynamic content identifying current values of shared variables;
- rendering the non-JSP dynamic content, including the additional non-JSP dynamic content, though dynamic server page engines, including passing current values of shared variables to the dynamic server page engines;
- reading from the non-JSP additional dynamic content as rendered the current values of shared variables;
- deleting from the non-JSP dynamic content as rendered the additional non-JSP dynamic content as rendered; and
- writing the non-JSP dynamic content as rendered, at its location among the static content, to the output of the meta-engine.

6. The system of claim 5 further comprising computer program instructions capable of identifying shared variables and current values of shared variables for the tag handler; and
- wherein the tag handler further comprises a tag library descriptor mapping tag handlers in a tag handler library to meta-tags each of which identifies a type of dynamic markup,
- wherein the tag handler library further comprises a tag handler for each type of non-JSP dynamic content supported by the meta-engine, wherein each tag handler comprises an identification of a dynamic server page engine for rendering one type of non-JSP dynamic content, and
- wherein rendering the non-JSP dynamic content though dynamic server page engines further comprises:
  - writing, from a tag handler to a dynamic server page, non-JSP dynamic content, including the additional non-JSP dynamic content; and
  - invoking a dynamic server page engine to render the non-JSP dynamic content.

7. A system for making a meta-engine, the system comprising a computer processor and a computer memory operatively coupled to the computer processor, the computer memory having disposed within it computer program instructions capable of:
- providing a tag library descriptor mapping tag handlers in a tag handler library to meta-tags each of which identifies a type of dynamic markup;
- providing the tag handler library comprising a tag handler for each type of non-JSP dynamic content supported by the meta-engine, wherein each tag handler comprises an identification of a dynamic server page engine for rendering one type of non-JSP dynamic content, and each tag handler is programmed to carry out the steps of:
- identifying shared variables and current values of shared variables for the tag handler;
- inserting into non-JSP dynamic content additional non-JSP dynamic content identifying current values of shared variables;
- rendering non-JSP dynamic content, including the additional non-JSP dynamic content, though dynamic server page engines, including passing current values of shared variables to the dynamic server page engines;
- reading from the non-JSP additional dynamic content as rendered the current values of shared variables;
- deleting from the non-JSP dynamic content as rendered the additional non-JSP dynamic content as rendered; and
- writing the non-JSP dynamic content as rendered, at its location among the static content, to the output of the meta-engine.

8. A system for creating a meta-page, the system comprising a computer processor and a computer memory operatively coupled to the computer processor, the computer memory having disposed within it computer program instructions capable of:
- establishing a JSP dynamic server page as the meta-page;
- inserting static content into the meta-page;
- inserting JSP dynamic content and one or more types of non-JSP dynamic content at two or more locations among the static content, wherein the JSP dynamic content can be rendered through a dynamic server page meta-engine, and the one or more type of non-JSP dynamic content can be rendered through dynamic server page engines; and
- inserting into the meta-page identifications of shared variables, including inserting into the meta-page Java code identifying shared variables,
- wherein inserting Java code identifying shared variables further comprises:
  - inserting Java code associating shred variables with segments of non-JSP dynamic content; and
  - inserting Java code associating shared variables with input and output to and from segments of non-JSP dynamic content.

9. A computer program product for rendering a dynamic server meta-page ("a meta-page") through a dynamic server page meta-engine ("a meta-engine") comprising a tag handler, the meta-page comprising static content, JSP dynamic content and one or more types of non-JSP dynamic content inserted at two or more locations among the static content, and identifications of shared variables, the computer program product comprising:
- a recording medium;
- means, recorded on the recording medium, for writing, to an output of the meta-engine, the static content of the meta-page;
- means, recorded on the recording medium, for rendering the JSP dynamic content, at its location among the static content, to the output of the meta-engine;
- means, recorded on the recording medium, for inserting into the non-JSP dynamic content additional non-JSP dynamic content identifying current values of shared variables;
- means, recorded on the recording medium, for rendering the non-JSP dynamic content, including the additional non-JSP dynamic content, through dynamic server page engines, including means, recorded on the recording medium, for passing current values of shared variables to the dynamic server page engines;
- means, recorded on the recording medium, for reading from the non-JSP additional dynamic content as rendered the current values of shared variables;

means, recorded on the recording medium, for deleting from the non-JSP dynamic content as rendered the additional non-JSP dynamic content as rendered; and means, recorded on the recording medium, for writing the non-JSP dynamic content as rendered, at its location among the static content, to the output of the meta-engine.

10. The computer program product of claim 9 further comprising means, recorded on the recording medium, for identifying shared variables and current values of shared variables for the tag handler; and wherein the tag handler further comprises a tag library descriptor mapping tag handlers in a tag handler library to meta-tags each of which identifies a type of dynamic markup, wherein the tag handler library further comprises a tag handler for each type of non-JSP dynamic content supported by the meta-engine, wherein each tag handler comprises an identification of a dynamic server page engine for rendering one type of non-JSP dynamic content, and wherein means, recorded on the recording medium, for rendering the non-JSP dynamic content through dynamic server page engines further comprises means, recorded on the recording medium, for writing, from a tag handler to a dynamic server page, non-JSP dynamic content, including the additional non-JSP dynamic content; and means, recorded on the recording medium, for invoking a dynamic server page engine to render the non-JSP dynamic content.

11. A computer program product for making a meta-engine, the computer program product comprising:

a recording medium;

means, recorded on the recording medium, for providing a tag library descriptor mapping tag handlers in a tag handler library to meta-tags each of which identifies a type of dynamic markup;

means, recorded on the recording medium, for providing the tag handler library comprising a tag handler for each type of non-JSP dynamic content supported by the meta-engine, wherein each tag handler comprises an identification of a dynamic server page engine for rendering one type of non-JSP dynamic content, and each tag handler is programmed to carry out the steps of:

identifying shared variables and current values of shared variables for the tag handler;

inserting into non-JSP dynamic content additional non-JSP dynamic content identifying current values of shared variables;

rendering non-JSP dynamic content, including the additional non-JSP dynamic content, through dynamic server page engines, including means, recorded on the recording medium, for passing current values of shared variables to the dynamic server page engines;

reading from the non-JSP additional dynamic content as rendered the current values of shared variables;

deleting from the non-JSP dynamic content as rendered the additional non-JSP dynamic content as rendered; and writing the non-JSP dynamic content as rendered, at its location among the static content, to the output of the meta-engine.

12. A computer program product for creating a meta-page, the computer program product comprising:

a recording medium;

means, recorded on the recording medium, for establishing a JSP dynamic server page as the meta-page;

means, recorded on the recording medium, for inserting static content into the meta-page;

means, recorded on the recording medium, for inserting JSP dynamic content and one or more types of non-JSP dynamic content at two or more locations among the static content, wherein the JSP dynamic content can be rendered through a dynamic server page meta-engine, and the one or more type of non-JSP dynamic content can be rendered through dynamic server page engines; and means, recorded on the recording medium, for inserting into the meta-page identifications of shared variables, including means, recorded on the recording medium, for inserting into the meta-page Java code identifying shared variables, wherein means, recorded on the recording medium, for inserting Java code identifying shared variables further comprises:

means, recorded on the recording medium, for inserting Java code associating shared variables with segments of non-JSP dynamic content; and means, recorded on the recording medium, for inserting Java code associating shared variables with input and output to and from segments of non-JSP dynamic content.

* * * * *